(12) United States Patent
Lee et al.

(10) Patent No.: US 12,449,149 B2
(45) Date of Patent: Oct. 21, 2025

(54) AIR CONDITIONER WITH BASE DEFROSTER

(71) Applicant: SAMSUNG ELECTRONICS CO., LTD., Suwon-si (KR)

(72) Inventors: Hansuk Lee, Suwon-si (KR); Chulbyung Park, Suwon-si (KR); Jeimin Choi, Suwon-si (KR); Dongil Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 145 days.

(21) Appl. No.: 18/140,047

(22) Filed: Apr. 27, 2023

(65) Prior Publication Data
US 2024/0077224 A1 Mar. 7, 2024

Related U.S. Application Data

(63) Continuation of application No. PCT/KR2023/005350, filed on Apr. 20, 2023.

(30) Foreign Application Priority Data

Jul. 15, 2022 (KR) .......................... 10-2022-0087845

(51) Int. Cl.
*F24F 11/42* (2018.01)
*F24F 1/14* (2011.01)
(Continued)

(52) U.S. Cl.
CPC ................ *F24F 11/42* (2018.01); *F24F 1/14* (2013.01); *F24F 1/30* (2013.01); *F24F 13/22* (2013.01);
(Continued)

(58) Field of Classification Search
CPC ...... F24F 1/14; F24F 1/30; F24F 11/42; F24F 13/22; F25B 13/00; F25B 47/022;
(Continued)

(56) References Cited

U.S. PATENT DOCUMENTS 5,156,014 A * 10/1992 Nakamura .............. F25B 41/20
62/160
9,377,225 B2 6/2016 Song et al.
(Continued)

FOREIGN PATENT DOCUMENTS

EP 2 808 626 B1 7/2020
JP 2022-524763 A 5/2022
(Continued)

OTHER PUBLICATIONS

KR 10-2020-0050645 (English translation) (Year: 2020).*
(Continued)

*Primary Examiner* — Jonathan Bradford
(74) *Attorney, Agent, or Firm* — STAAS & HALSEY LLP

(57) ABSTRACT

An air conditioner including a compressor including a discharge side; an outdoor heat exchanger configured to exchange heat with outdoor air; a base arranged to support the compressor and the outdoor heat exchanger; a four-way valve arranged between the discharge side of the compressor and the outdoor heat exchanger; a defrost pipe arranged at the base and configured to receive refrigerant discharged from the compressor to supply heat of the refrigerant discharged from the compressor to the base; and a defrost valve arranged on the defrost pipe and configured to adjust a flow rate of the refrigerant flowing through the defrost pipe.

15 Claims, 19 Drawing Sheets

(51) Int. Cl.
 *F24F 1/30* (2011.01)
 *F24F 13/22* (2006.01)
 *F25B 47/02* (2006.01)
 *F25B 13/00* (2006.01)
 *F25B 49/02* (2006.01)

(52) U.S. Cl.
 CPC ............ *F25B 47/022* (2013.01); *F25B 13/00* (2013.01); *F25B 49/02* (2013.01); *F25B 2347/023* (2013.01); *F25B 2700/11* (2013.01); *F25B 2700/2101* (2013.01); *F25B 2700/2106* (2013.01)

(58) Field of Classification Search
 CPC ................ F25B 49/02; F25B 2347/023; F25B 2700/11; F25B 2700/2101; F25B 2700/2106
 See application file for complete search history.

(56) References Cited

U.S. PATENT DOCUMENTS

| | | | |
|---|---|---|---|
| 2011/0154845 | A1 | 6/2011 | Ashida |
| 2020/0370808 | A1* | 11/2020 | Feng .................. F25B 30/02 |
| 2021/0215403 | A1 | 7/2021 | Feng et al. |
| 2022/0136750 | A1 | 5/2022 | Yoshikawa et al. |

FOREIGN PATENT DOCUMENTS

| | | |
|---|---|---|
| KR | 10-0309281 B1 | 9/2001 |
| KR | 2002-0086014 A | 11/2002 |
| KR | 10-0474907 B1 | 3/2005 |
| KR | 10-2005-0082386 A | 8/2005 |
| KR | 10-0673274 B1 | 1/2007 |
| KR | 10-2008-0023106 A | 3/2008 |
| KR | 10-2009-0099613 A | 9/2009 |
| KR | 10-0957178 B1 | 5/2010 |
| KR | 10-1833400 B1 | 2/2018 |
| KR | 10-2020-0050645 A | 5/2020 |
| KR | 10-2288427 B1 | 8/2021 |

OTHER PUBLICATIONS

International Search Report dated Aug. 2, 2023 for International Application No. PCT/KR2023/005350.
Written Opinion of the International Searching Authority dated Aug. 2, 2023 for International Application No. PCT/KR2023/005350.

* cited by examiner

AIR CONDITIONER WITH BASE DEFROSTER

CROSS-REFERENCE TO RELATED APPLICATION(S)

This application is a continuation application, under 35 U.S.C. § 111(a), of international application No. PCT/KR2023/005350, filed on Apr. 20, 2023, which claims priority to Korean Patent Application No. 10-2022-0087845, filed on Jul. 15, 2022, in the Korean Intellectual Property Office, the disclosures of which are incorporated by reference herein in their entireties.

BACKGROUND

1. Field

The disclosure relates to an air conditioner including an improved structure.

2. Description of Related Art

An air conditioner is a device that cools or heats air by using the movement of heat generated from evaporation and condensation of refrigerant, and that conditions air in an indoor space by discharging the cooled or heated air. The air conditioner may cool or heat an indoor space by using the refrigeration cycle during a cooling operation or a heating operation.

For example, in a low-temperature environment, defrost water may collect and freeze at a base of an outdoor unit. In order to prevent freezing of the base, a heater and a control device for supplying electricity to the heater may be separately required. However, when using the heater and the control device, electricity consumption may increase.

SUMMARY

Aspects of the disclosure will be set forth in part in the description which follows and, in part, will be obvious from the description, or may be learned by practice of the disclosure.

According to an embodiment of the disclosure, an air conditioner may include a compressor including a discharge side; an outdoor heat exchanger configured to exchange heat with outdoor air; a base arranged to support the compressor and the outdoor heat exchanger; a four-way valve arranged between the discharge side of the compressor and the outdoor heat exchanger; a defrost pipe arranged at the base and configured to receive refrigerant discharged from the compressor to supply heat of the refrigerant discharged from the compressor to the base; and a defrost valve arranged on the defrost pipe and configured to adjust a flow rate of the refrigerant flowing through the defrost pipe.

According to an embodiment of the disclosure, the air conditioner further includes a controller configured to control an opening degree of the defrost valve.

According to an embodiment of the disclosure, the air conditioner further includes an expansion valve configured to depressurize a refrigerant flowing into or flowing out of the outdoor heat exchanger, wherein a first end of the defrost pipe is connected to the discharge side of the compressor, and a second end of the defrost pipe is connected between the outdoor heat exchanger and the expansion valve.

According to an embodiment of the disclosure, the outdoor heat exchanger includes an upper part, and a lower part.

The four-way valve is a first four-way valve. The first four-way valve is arranged between the discharge side of the compressor and the upper part of the outdoor heat exchanger. The air conditioner further includes a second four-way valve arranged between the discharge side of the compressor and the lower part of the outdoor heat exchanger.

According to an embodiment of the disclosure, the air conditioner further includes an expansion valve configured to depressurize a refrigerant flowing into or flowing out of the outdoor heat exchanger, wherein a first end of the defrost pipe is connected to the second four-way valve, and a second end of the defrost pipe is connected between the outdoor heat exchanger and the expansion valve.

According to an embodiment of the disclosure, the air conditioner further includes a temperature sensor configured to detect a temperature of the defrost pipe or to detect an outdoor temperature.

According to an embodiment of the disclosure, the controller is configured to control the defrost valve based on information of the temperature sensor corresponding to the detected temperature.

According to an embodiment of the disclosure, the controller is configured to open the defrost valve in response to the detected temperature being less than or equal to a predetermined reference temperature during a heating operation.

According to an embodiment of the disclosure, the controller is configured to close the defrost valve in response to the detected temperature being greater than or equal to a predetermined reference temperature during a heating operation.

According to an embodiment of the disclosure, the temperature sensor is arranged on the defrost pipe upstream of the defrost valve to detect the temperature of the defrost pipe.

According to an embodiment of the disclosure, the air conditioner further includes a first connection pipe arranged to connect the discharge &de of the compressor and the first four-way valve; and a second connection pipe arranged to connect the discharge side of the compressor and the second four-way valve, wherein the defrost pipe is arranged to branch from the first connection pipe or the second connection pipe.

According to an embodiment of the disclosure, the air conditioner further includes an accumulator connected to a suction side of the compressor and configured to separate a refrigerant into a liquid refrigerant and a gas refrigerant, wherein the second four-way valve includes a first port connected to the compressor, a second port connected to the accumulator, a third port connected to the lower part of the outdoor heat exchanger; and a fourth port connected to the first end of the defrost pipe.

According to an embodiment of the disclosure, the refrigerant in the defrost pipe flows from the first end of the defrost pipe toward the second end of the defrost pipe.

According to an embodiment of the disclosure, during a main defrosting operation, the first four-way valve is configured to supply the refrigerant discharged from the compressor to the upper part of the outdoor heat exchanger, the second four-way valve is configured to supply the refrigerant discharged from the compressor to the lower part of the outdoor heat exchanger, and the defrost valve is configured to be opened.

According to an embodiment of the disclosure, the air conditioner further includes an indoor heat exchanger configured to exchange heat with indoor air; and an accumulator configured to separate a refrigerant into a liquid refrigerant and a gas refrigerant at a suction side of the compressor, wherein the first four-way valve includes a first port connected to the discharge side of the compressor, a second port connected to the accumulator, a third port connected to the upper part of the outdoor heat exchanger, and a fourth port connected to the indoor heat exchanger, the second four-way valve includes a fifth port connected so as to receive refrigerant from the discharge side of the compressor, and a sixth port connected to the lower part of the outdoor heat exchanger, and in response to requiring a sub-defrosting operation of the lower part of the outdoor heat exchanger, the first port and the fourth port of the first four-way valve are connected, the second port and the third port of the first four-way valve are connected, and the fifth port and the sixth port of the second four-way valve are connected.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
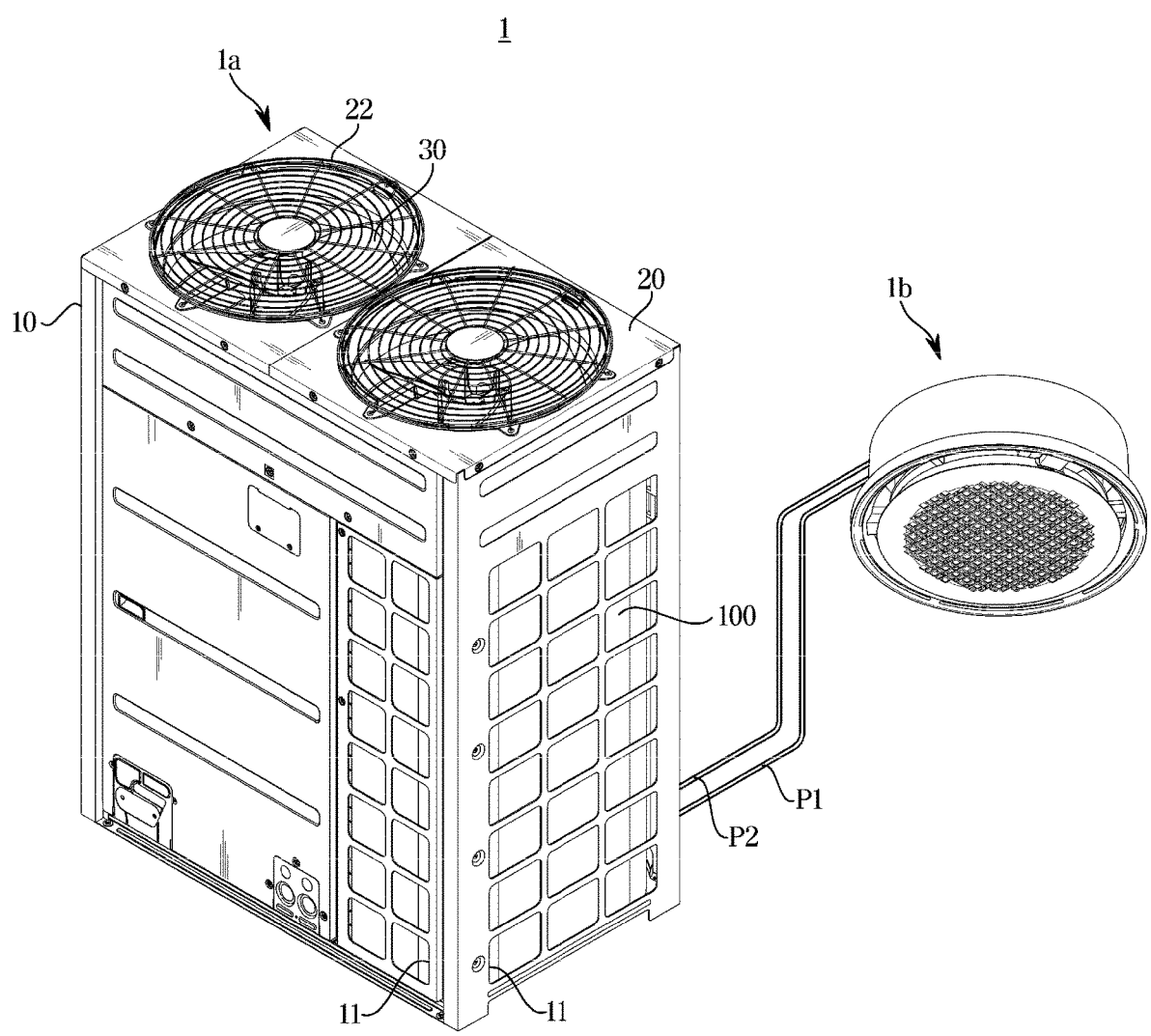
FIG. 1 is a perspective view illustrating an example of an air conditioner according to an embodiment of the disclosure.

Embodiments described in the disclosure and configurations shown in the drawings are merely examples of the embodiments of the disclosure, and may be modified in various different ways at the time of filing of the present application to replace the embodiments and drawings of the disclosure.

The same reference numerals or signs shown in the drawings of the disclosure indicate elements or components performing substantially the same function.

The terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that when an element is referred to as being "connected" another element, it can be directly or indirectly connected to the other element. Further, it will be understood that when an element is referred to as being "coupled" another element, it can be directly or indirectly coupled to the other element.

Throughout the description, when a member is "on" another member, this includes not only when the member is in contact with the other member, but also when there is another member between the two members.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

An identification code is used for the convenience of the description but is not intended to illustrate the order of each step. The each step may be implemented in the order different from the illustrated order unless the context clearly indicates otherwise.

Embodiments of the disclosure may provide an air conditioner including an improved structure. Embodiments of the disclosure may provide an air conditioner capable of preventing freezing of a base of an outdoor unit. Embodiments of the disclosure may provide an air conditioner having an improved defrosting performance.

Reference will now be made in detail to embodiments of the disclosure, examples of which are illustrated in the accompanying drawings.

FIG. 1 is a perspective view illustrating an example of an air conditioner according to an embodiment.

Referring to FIG. 1, an air conditioner 1 may include an outdoor unit 1a configured to perform heat exchange between outdoor air and a refrigerant. The air conditioner 1 may include an indoor unit 1b configured to perform heat exchange between indoor air and a refrigerant.

The outdoor unit 1a may be located outside an air conditioning space. The indoor unit 1b may be located in the air conditioning space. The air conditioning space may refer to a space cooled or heated by the air conditioner 1.

The outdoor unit 1a may be arranged in an outdoor space. For example, the outdoor unit 1a may be arranged outside of a building. The indoor unit 1b may be provided in an indoor space. For example, the indoor unit 1b may be arranged in a space separated from the outside by a wall, such as a living room or an office. The indoor unit 1b may be installed on a ceiling.

The air conditioner 1 may include external pipes P1 and P2 for circulating a refrigerant between the indoor unit 1b and the outdoor unit 1a. The outdoor unit 1a and the indoor unit 1b may be connected through the external pipes P1 and P2. The refrigerant may circulate through the outdoor unit 1a, the external pipes P1 and P2, and the indoor unit 1b.

For example, one end of the external pipes P1 and P2 may be connected to pipe valves 101 and 102 of the outdoor unit 1a (refer to FIGS. 6 to 12). One end of the external pipes P1 and P2 may be connected to a refrigerant pipe provided inside the outdoor unit 1a. The other end of the external pipes P1 and P2 may be connected to pipe valves 201 and 202 of the indoor unit 1b (refer to FIG. 5). The other end of the external pipes P1 and P2 may be connected to a refrigerant pipe provided inside the indoor unit 1b.

The external pipes P1 and P2 may include a first external pipe P1 serving as a passage through which a liquid refrigerant flows and a second external pipe P2 serving as a passage through which a gas refrigerant flows. The first external pipe P1 may be referred to as a liquid pipe. The second external pipe P2 may be referred to as a gas pipe.

The outdoor unit 1a may include a cabinet 10. The cabinet 10 may form at least one surface of the outdoor unit 1a. An outdoor heat exchanger 100 may be arranged inside the cabinet 10. The cabinet 10 may accommodate the outdoor heat exchanger 100.

The outdoor unit 1a may include a fan cover 20 provided to cover an upper portion of the cabinet 10. The fan cover 20 may be provided to cover a fan assembly 30. A fan guard 22 for discharging air and protecting the fan assembly 30 may be provided on the fan cover 20. The fan cover 20 may include a discharge port corresponding to the shape of the fan assembly 30. The fan guard 22 may be provided to cover the discharge port of the fan cover 20. For example, the fan guard 22 may have a grille or mesh shape.

The outdoor unit 1a may include the fan assembly 30 arranged within the cabinet 10. The fan assembly 30 may generate a blowing force. By the operation of the fan assembly 30, outdoor air may pass through the inside of the cabinet 10 of the outdoor unit 1a and then be discharged to the outside of the cabinet 10. Air flowing by the operation of the fan assembly 30 may be discharged to the outside of the outdoor unit 1a through the fan guard 22.

Two fan assemblies 30 are shown, but embodiments of the disclosure are not limited thereto. For example, one or three or more fan assemblies 30 may be provided.

FIG. 1 illustrates the air conditioner 1 including a single outdoor unit 1a and a single indoor unit 1b, but is not limited thereto. The air conditioner 1 may include at least one outdoor unit 1a and at least one indoor unit 1b. For example, a plurality of indoor units 1b may be connected to a single outdoor unit 1a. For example, a plurality of indoor units 1b may be connected to a plurality of outdoor units 1a. Further, the shape of the indoor unit 1b is not limited thereto. Any type of indoor unit 1b may be applied as long as the indoor unit 1b is installed in an indoor space to cool or heat the indoor space.

Figure 2:
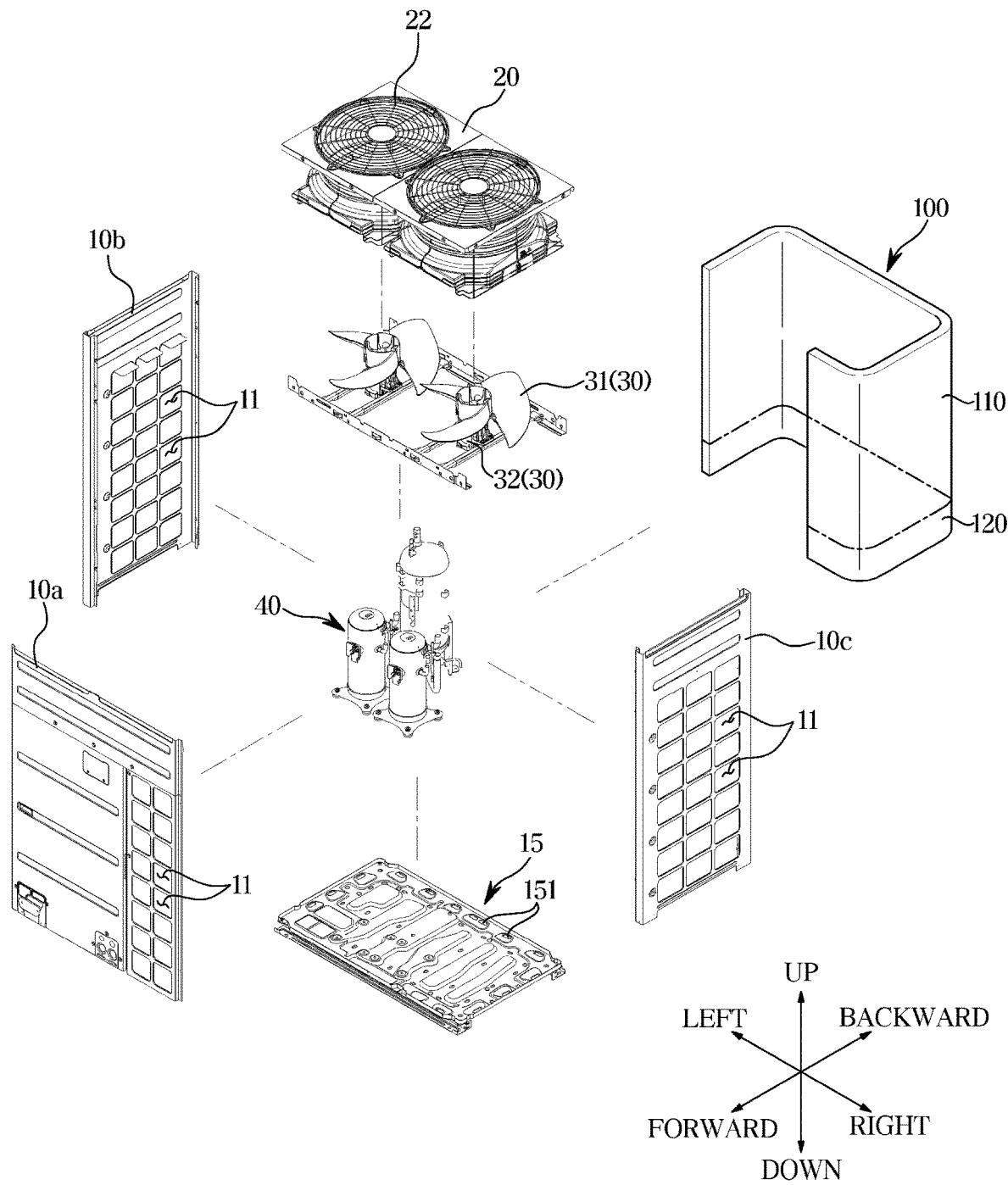
FIG. 2 is an exploded view illustrating an example of an outdoor unit according to an embodiment of the disclosure.

FIG. 2 is an exploded view illustrating an example of an outdoor unit according to an embodiment.

The outdoor unit 1a may include a main body. The main body may form at least a part of the exterior of the outdoor unit 1a. The main body may be provided to accommodate the components of the outdoor unit 1a. The main body may also be referred to as a housing or casing.

The outdoor unit 1a may include the cabinet 10. For example, the cabinet 10 may include a front cabinet 10a, a left cabinet 10b, a right cabinet 10c, and a rear cabinet (not shown). The front cabinet 10a and the rear cabinet (not shown) may have sizes corresponding to each other. The left cabinet 10b and the right cabinet 10c may have sizes corresponding to each other. For example, the cabinet 10 may be provided as one component of the main body.

The cabinet 10 may include a suction port 11 provided to suck outdoor air into the outdoor unit 1a. Outdoor air sucked into the outdoor unit 1a through the suction port 11 may exchange heat with the outdoor heat exchanger 100 and then be discharged to the outside of the outdoor unit 1a through the fan guard 22.

The outdoor unit 1a may include a base 15. The base 15 may be provided to support the components of the outdoor unit 1a. A configuration of the refrigeration cycle may be seated on the base 15. For example, the base 15 may be provided to support a compressor 40 and/or the outdoor heat exchanger 100. For example, the base 15 may be provided as one component of the main body.

The base 15 may be arranged under the cabinet 10. For example, the base 15 may be coupled to lower ends of the front cabinet 10a, the left cabinet 10b, the right cabinet 10c, and the rear cabinet (not shown). However, it is not limited thereto, and the base 15 may be integrally formed with the cabinet 10.

The base 15 may include a base hole 151. The base hole 151 may be provided to discharge water inside the outdoor unit 1a. The base hole 151 may be provided to drain water generated in the outdoor heat exchanger 100. The base hole 151 may be provided to discharge condensed water and/or defrost water to the outside of the outdoor unit 1a. The base hole 151 may be referred to as a drain hole 151.

The fan cover 20 may be arranged above the cabinet 10. For example, the fan cover 20 may be coupled to an upper end of each of the front cabinet 10a, the left cabinet 10b, the right cabinet 10c, and the rear cabinet (not shown). However, it is not limited thereto, and the fan cover 20 may be integrally formed with the cabinet 10.

The fan cover 20 may be arranged above the fan assembly 30.

The fan assembly 30 may be arranged inside the outdoor unit 1a. The fan assembly 30 may be arranged inside the main body. The fan assembly 30 may include a blade 31. The fan assembly 30 may include a motor 32. The blade 31 may be rotated by the operation of the motor 32. Air may flow by rotation of the blade 31.

The compressor 40 may be configured to compress the refrigerant. The compressor 40 may be arranged inside the outdoor unit 1a. The compressor 40 may be arranged inside the main body. The compressor 40 may be supported by the base 15.

The outdoor unit 1a may include the outdoor heat exchanger 100 configured to exchange heat with outdoor air. The outdoor heat exchanger 100 may operate as a condenser during a cooling operation and the outdoor heat exchanger 100 may operate as an evaporator during a heating operation.

The outdoor heat exchanger 100 may include a first region 110 and a second region 120 provided under the first region 110. The first region 110 of the outdoor heat exchanger 100 may be referred to as an upper part 110 of the outdoor heat exchanger 100. The second region 120 of the outdoor heat exchanger 100 may be referred to as a lower part 120 of the outdoor heat exchanger 100.

For example, the first region 110 of the outdoor heat exchanger 100 may mean a region that includes an upper end of the outdoor heat exchanger 100 among the entire regions of the outdoor heat exchanger 100 and has a predetermined distance from the upper end of the outdoor heat exchanger 100. The second region 120 of the outdoor heat exchanger 100 may mean a region that includes a region excluding the first region 110 from the entire regions of the outdoor heat exchanger 100. The second region 120 of the outdoor heat exchanger 100 may include a lower end of the outdoor heat exchanger 100.

The outdoor heat exchanger 100 may be arranged along an inner circumference of the cabinet 10. For example, the outdoor heat exchanger 100 may extend along at least one surface of the cabinet 10. The outdoor heat exchanger 100 may be provided in a shape in which a portion adjacent to a corner of the cabinet 10 is bent. However, the position and shape of the outdoor heat exchanger 100 may vary as long as the outdoor heat exchanger 100 exchanges heat with outdoor air.

For example, the outdoor heat exchanger 100 may include a refrigerant tube (not shown). The refrigerant may be condensed or evaporated while flowing along a flow path formed by the refrigerant tube. The refrigerant may release heat while being condensed. The refrigerant may absorb heat from the surrounding air while being evaporated.

For example, the outdoor heat exchanger 100 may include a plurality of heat exchange fins (not shown). The plurality of heat exchange fins may be arranged in a direction perpendicular to a longitudinal direction of the refrigerant tube. The plurality of heat exchange fins may be spaced apart at predetermined intervals. The plurality of heat exchange fins may serve to increase the heat exchange area of the refrigerant tube.

Figure 3:
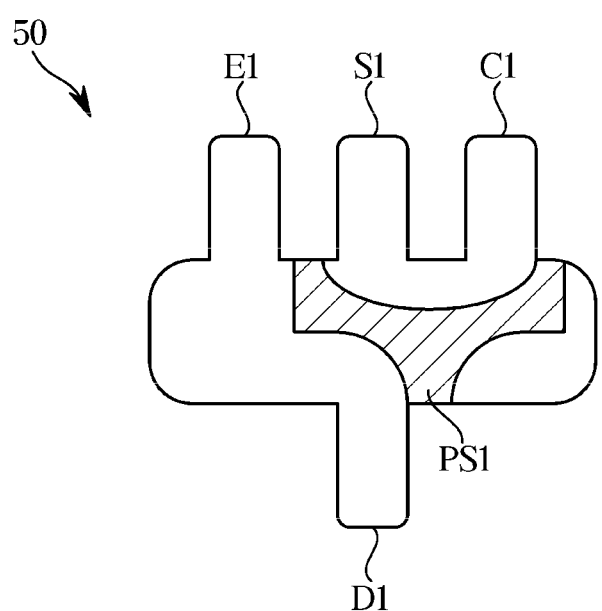
FIG. 3 is a view illustrating an example of a first four-way valve according to an embodiment of the disclosure.
Figure 4:
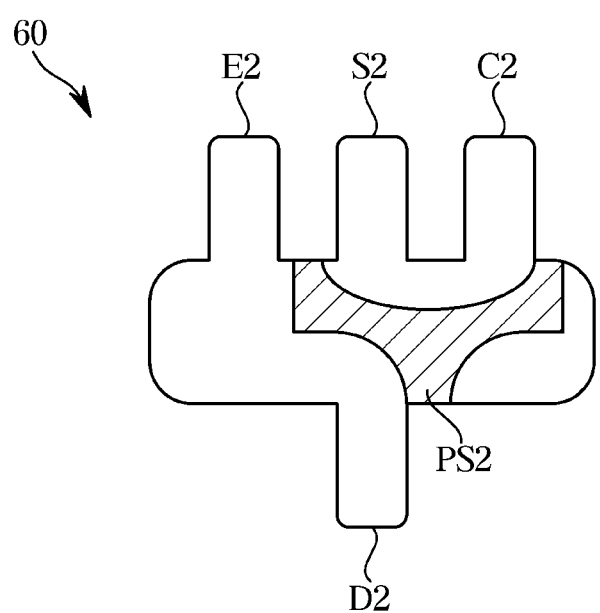
FIG. 4 is a view illustrating an example of a second four-way valve according to an embodiment of the disclosure.

FIG. 3 is a view illustrating an example of a first four-way valve according to an embodiment. FIG. 4 is a view illustrating an example of a second four-way valve according to an embodiment.

Referring to FIG. 3, a first four-way valve 50 may include four ports. For example, the first four-way valve 50 may include a D port D1, a S port S1, a C port C1, and an E port E1.

The first four-way valve 50 may include a piston assembly PS1. The piston assembly PS1 may be movable, and a flow direction of the refrigerant may be determined according to the position of the piston assembly PS1.

Referring to FIG. 4, a second four-way valve 60 may include four ports. For example, the second four-way valve 60 may include a D port D2, a S port S2, a C port C2, and an E port E2.

The second four-way valve 60 may include a piston assembly PS2. The piston assembly PS2 may be movable, and a flow direction of the refrigerant may be determined according to the position of the piston assembly PS2.

Figure 5:
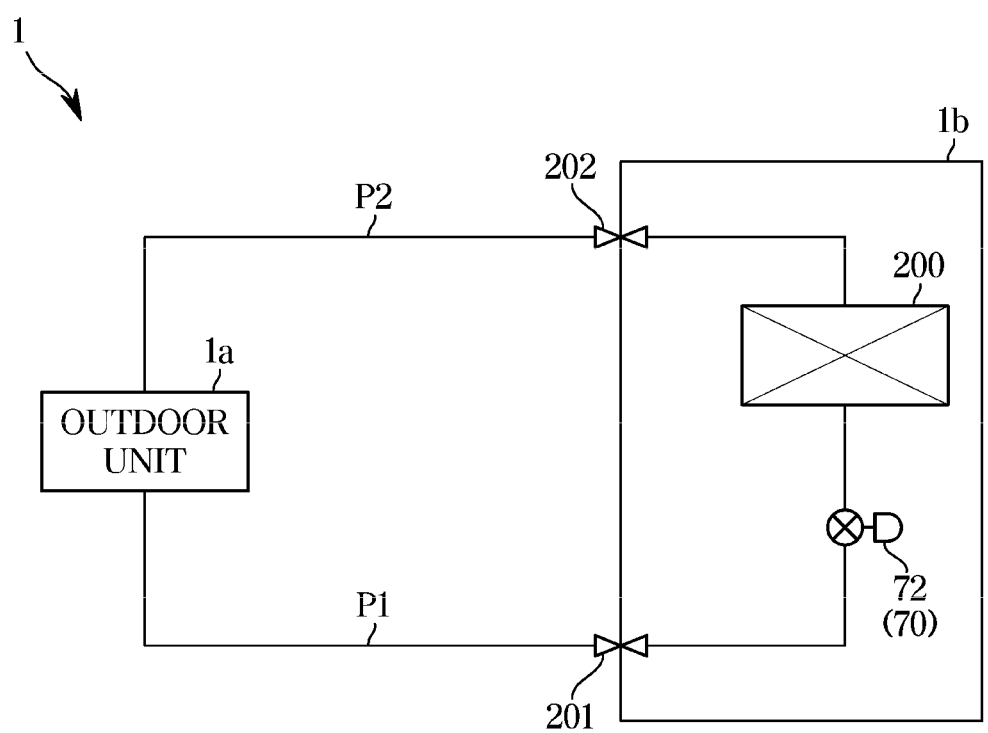
FIG. 5 is a diagram schematically illustrating an example of the air conditioner according to an embodiment of the disclosure.

FIG. 5 is a diagram schematically illustrating an example of the air conditioner according to an embodiment.

The indoor unit 1b may include an indoor heat exchanger 200 configured to exchange heat with indoor air. The indoor heat exchanger 200 may operate as an evaporator during the cooling operation and the indoor heat exchanger 200 may operate as a condenser during the heating operation.

The air conditioner 1 may include an expansion valve 70 configured to depressurize the refrigerant. The indoor unit 1b may include an indoor expansion valve 72 arranged inside the indoor unit 1b to depressurize the refrigerant. However, this is not an essential configuration and may be omitted in some cases. For example, when the outdoor unit 1a includes an outdoor expansion valve 71, the indoor unit 1b may not include the indoor expansion valve 72.

The expansion valve 70 may be arranged in at least one of the outdoor unit 1a and the indoor unit 1b. The expansion valve 70 may be arranged only in the outdoor unit 1a. The expansion valve 70 may be arranged only in the indoor unit 1b. The expansion valve 70 may be arranged in both the outdoor unit 1a and the indoor unit 1b.

For example, the air conditioner 1 may include the outdoor expansion valve 71 (refer to FIGS. 6 to 12) provided in the outdoor unit 1a. The air conditioner 1 may include the indoor expansion valve 72 provided in the indoor unit 1b. The air conditioner 1 may include both the outdoor expansion valve 71 and the indoor expansion valve 72.

For example, when the air conditioner 1 includes both the outdoor expansion valve 71 and the indoor expansion valve 72, the refrigerant may bypass one of the outdoor expansion valve 71 and the indoor expansion valve 72 by a bypass pipe (not shown). However, it is not limited thereto, and the refrigerant may pass through both the outdoor expansion valve 71 and the indoor expansion valve 72 in some cases.

The indoor unit 1b may include pipe valves 201 and 202. The indoor unit 1b may include the pipe valve 201 connected to the first external pipe P1. The indoor unit 1b may include the pipe valve 202 connected to the second external pipe P2.

Figure 6:
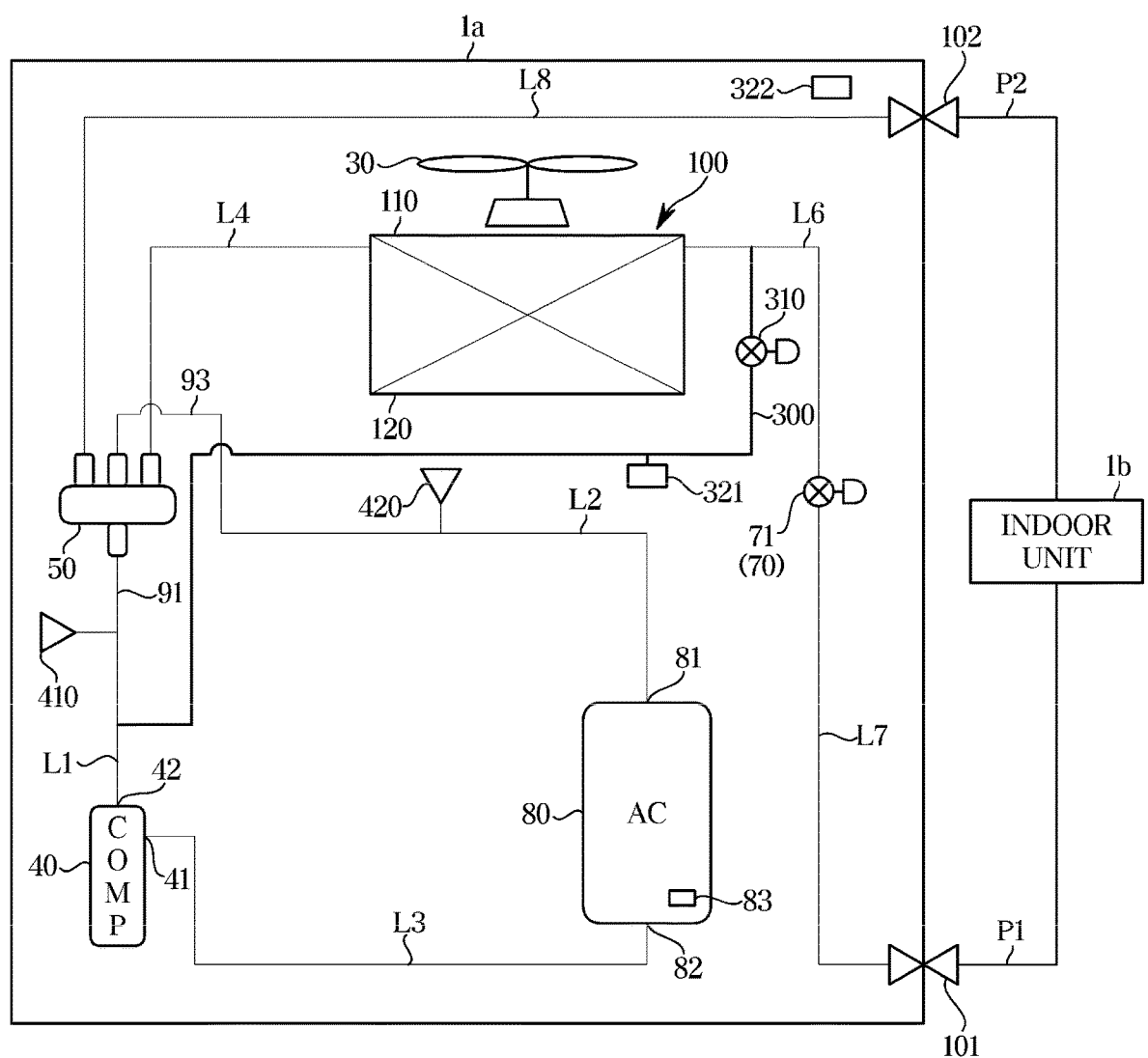
FIG. 6 is a diagram schematically illustrating an example of the air conditioner according to an embodiment of the disclosure.
Figure 7:
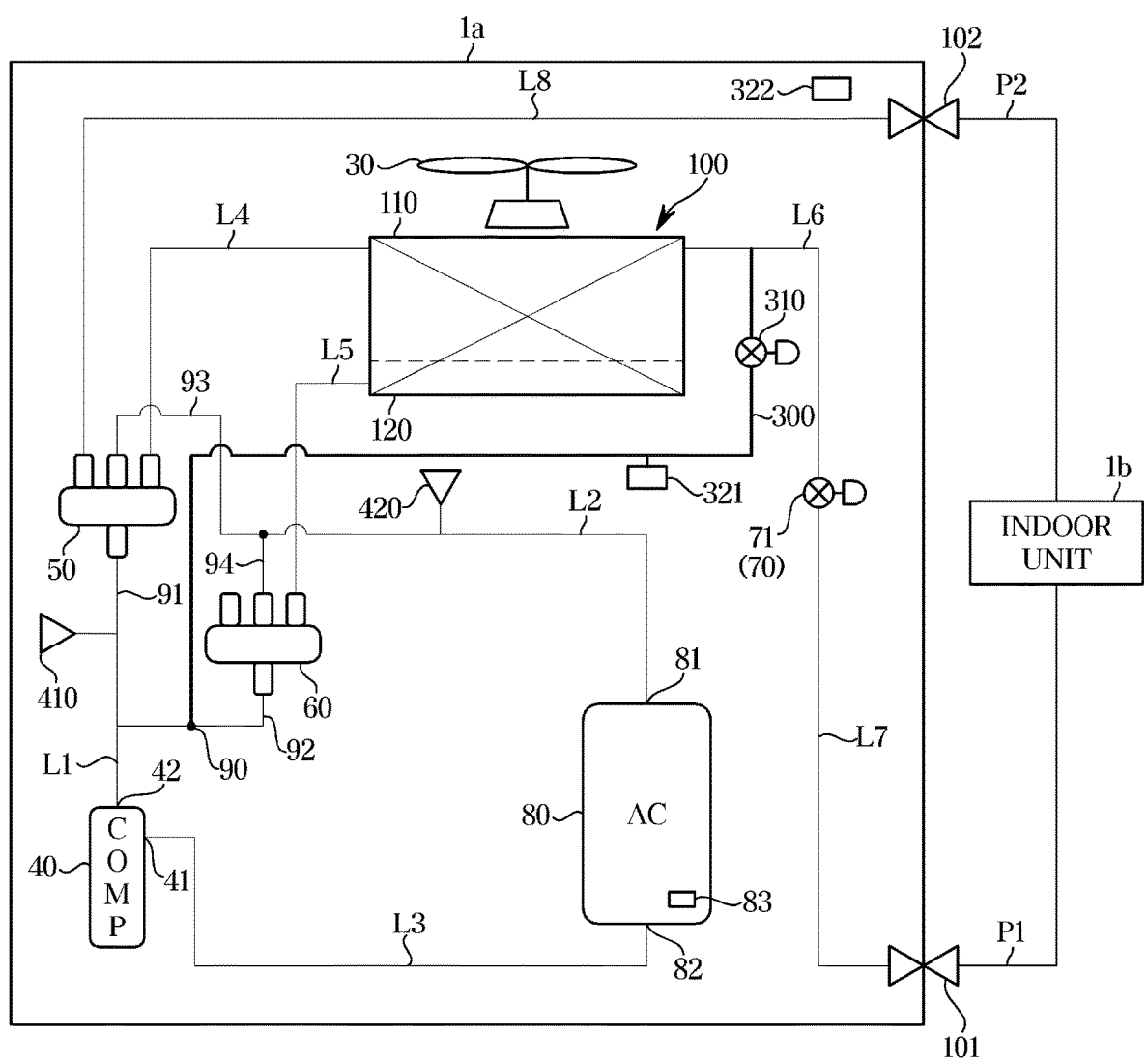
FIG. 7 is a diagram schematically illustrating an example of the air conditioner according to an embodiment of the disclosure.
Figure 8:
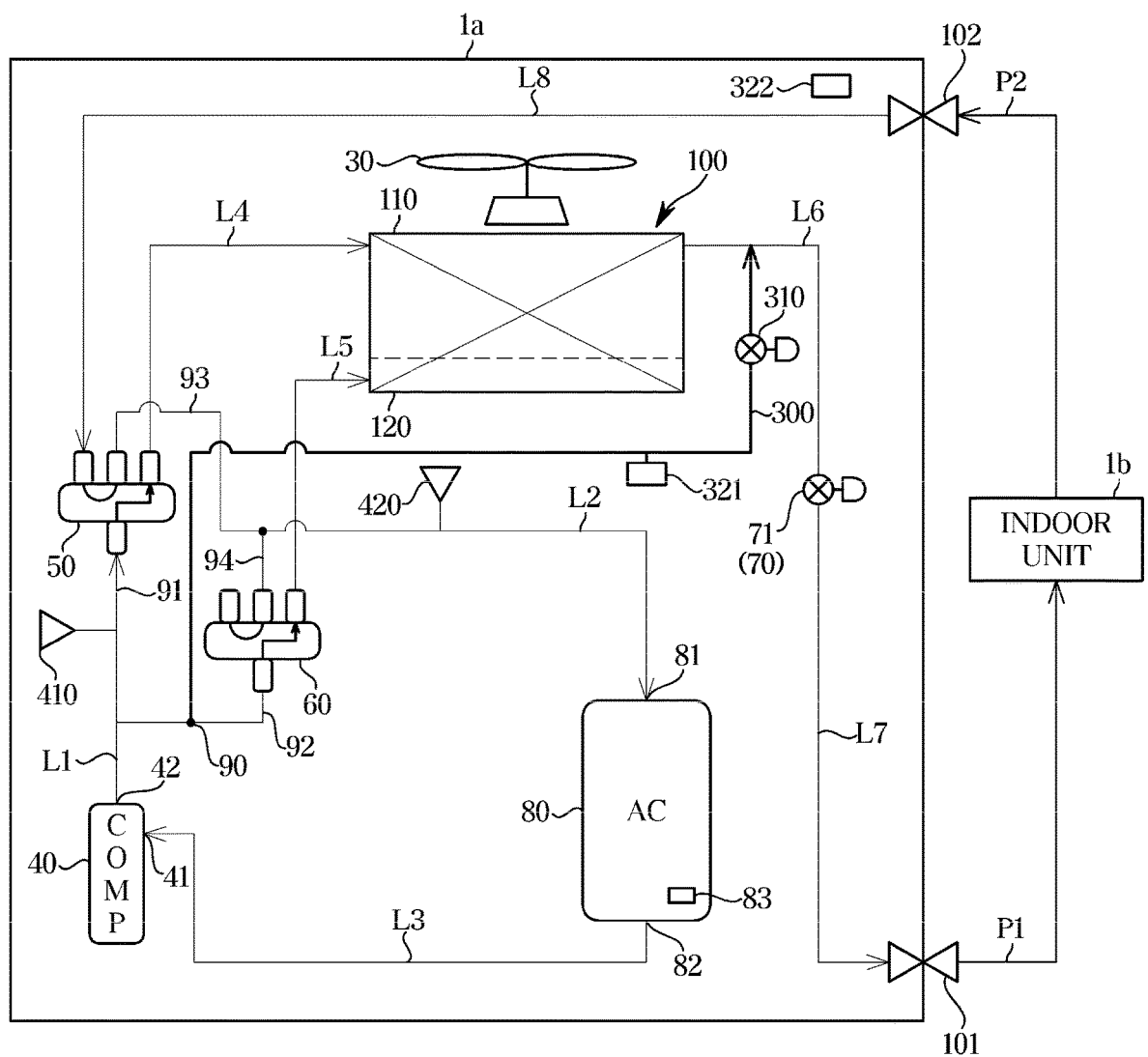
FIG. 8 is a diagram schematically illustrating a flow of a refrigerant during a first defrosting operation (main defrosting operation) of the air conditioner shown in FIG. 7 according to an embodiment of the disclosure.
Figure 9:
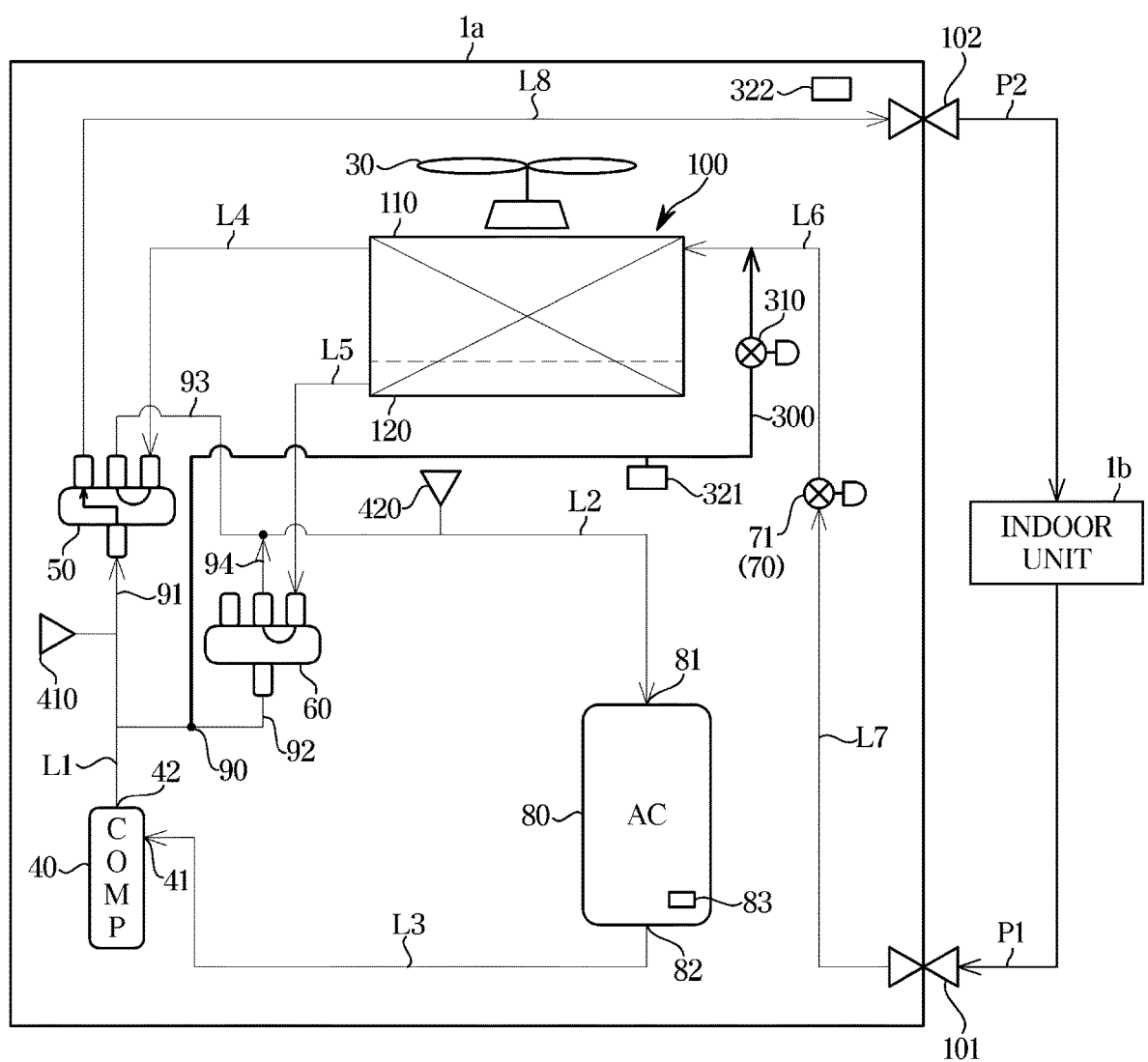
FIG. 9 is a diagram schematically illustrating a flow of a refrigerant during a heating operation of the air conditioner shown in FIG. 7 according to an embodiment of the disclosure.
Figure 10:
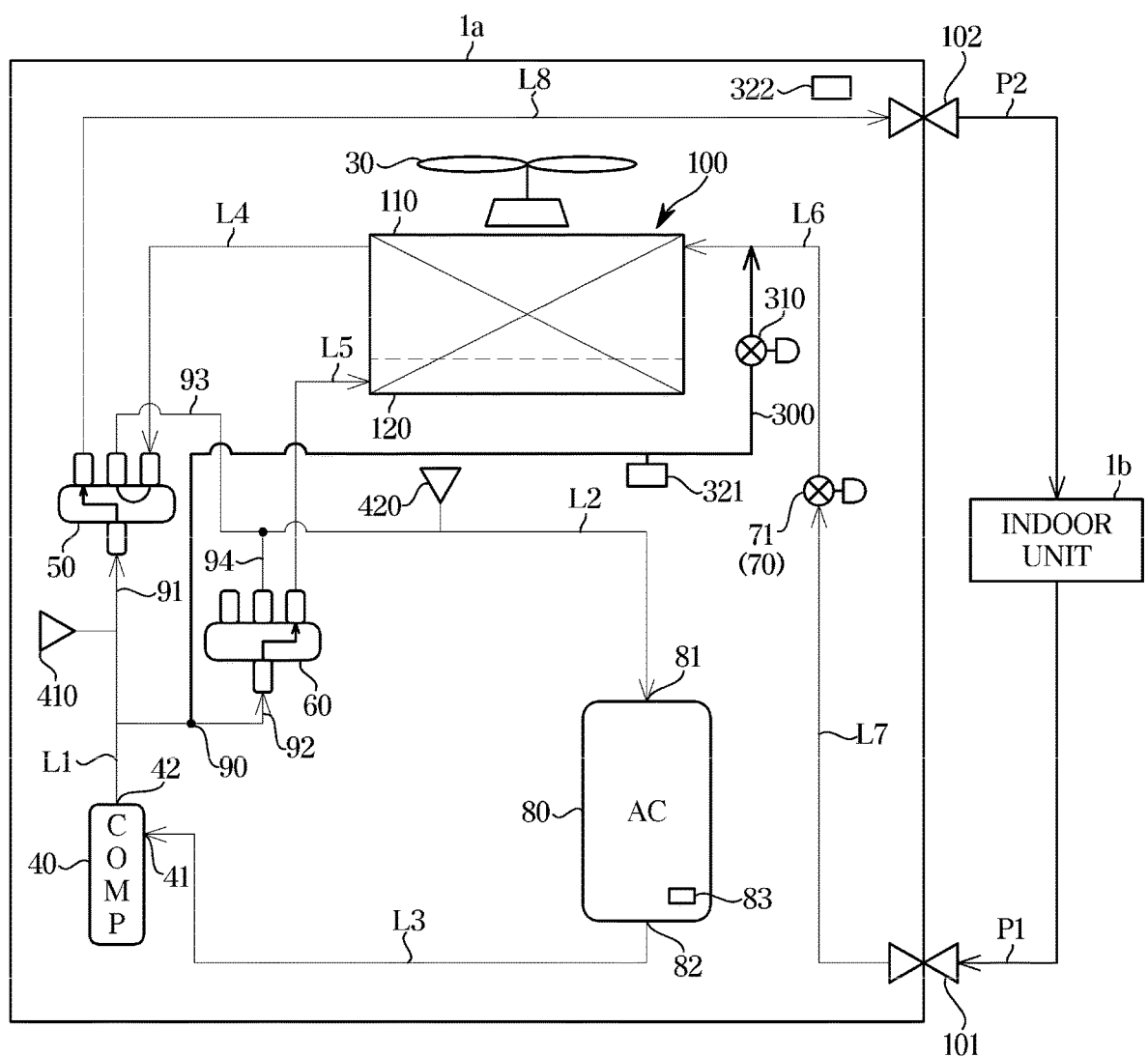
FIG. 10 is a diagram schematically illustrating a flow of a refrigerant during a second defrosting operation (sub-defrosting operation) of the air conditioner shown in FIG. 7 according to an embodiment of the disclosure.

FIG. 6 is a diagram schematically illustrating an example of the air conditioner according to an embodiment. FIG. 7 is a diagram schematically illustrating an example of the air conditioner according to an embodiment. FIG. 8 is a diagram schematically illustrating a flow of a refrigerant during a first defrosting operation (main defrosting operation) of the air conditioner shown in FIG. 7. FIG. 9 is a diagram schematically illustrating a flow of a refrigerant during a heating operation of the air conditioner shown in FIG. 7. FIG. 10 is a diagram schematically illustrating a flow of a refrigerant during a second defrosting operation (sub-defrosting operation) of the air conditioner shown in FIG. 7.

The outdoor unit 1a may include the fan assembly 30. The fan assembly 30 may arranged around the outdoor heat exchanger 100 to allow outdoor air to flow into the outdoor heat exchanger 100. The fan assembly 30 may suck air outside the outdoor unit 1a. The fan assembly 30 may move air, which is heat-exchanged in the outdoor heat exchanger 100, to the outside of the outdoor unit 1a.

The outdoor unit 1a may include the compressor 40 configured to compress the refrigerant. The compressor 40 may discharge a high-temperature and high-pressure gaseous refrigerant. The refrigerant discharged from the compressor 40 may be referred to as hot gas.

A suction side 41 of the compressor 40 may be connected to an accumulator 80. The suction side 41 of the compressor 40 may be connected to a discharge side 82 of the accumulator 80.

The discharge side 42 of the compressor 40 may be connected to the first four-way valve 50. The discharge side 42 of the compressor 40 may be connected to the second four-way valve 60. The discharge side 42 of the compressor 40 may be connected to a defrost pipe 300. Details thereof will be described later.

For example, the compressor 40 may operate using electrical energy supplied from an external power source. The compressor 40 may include a compressor motor (not shown) and compress a low-pressure gaseous refrigerant to a high-pressure state by using a rotational force of the compressor motor. An operating frequency of the compressor 40 may be changed to correspond to a performance required by the indoor unit 1b. For example, the compressor 40 may be an inverter air compressor, a positive displacement compressor, or a dynamic compressor. However, it is not limited thereto, and various types of compressors that can be considered by designers may be used.

The outdoor unit 1a may include the outdoor heat exchanger 100. The outdoor heat exchanger 100 may be configured to perform heat exchange between outdoor air and a refrigerant. For example, the outdoor heat exchanger 100 may be divided into the upper part 110 and the lower part 120.

The outdoor unit 1a may include the first four-way valve 50 arranged between the compressor 40 and the outdoor heat exchanger 100. The first four-way valve 50 may be arranged between the discharge side 42 of the compressor 40 and the upper part 110 of the outdoor heat exchanger 100.

The D port D1 of the first four-way valve 50 may be connected to the discharge side 42 of the compressor 40. The D port D1 of the first four-way valve 50 may be connected to a first line L1 extending from the discharge side 42 of the compressor 40. The S port S1 of the first four-way valve 50 may be connected to the suction side 81 of the accumulator 80. The S port S1 of the first four-way valve 50 may be connected to a second line L2 extending from the suction side 81 of the accumulator 80. The C port C1 of the first four-way valve 50 may be connected to the upper part 110 of the outdoor heat exchanger 100. The C port C1 of the first four-way valve 50 may be connected to a fourth line L4 extending from the upper part 110 of the outdoor heat exchanger 100. The E port E1 of the first four-way valve 50 may be connected to the indoor unit 1b. The E port E1 of the first four-way valve 50 may be connected to an eighth line L8 connected to the second external pipe P2. The E port E1 of the first four-way valve 50 may be connected to the indoor heat exchanger 200 of the indoor unit 1b through the second external pipe P2 and the eighth line L8.

The first four-way valve 50 may change the flow direction of the refrigerant. During a main defrosting operation, the first four-way valve 50 may be provided to guide the refrigerant compressed by the compressor 40 to the upper part 110 of the outdoor heat exchanger 100. During the main defrosting operation, the first four-way valve 50 may be provided to guide the refrigerant introduced from the indoor unit 1b to the accumulator 80. During the heating operation or a sub-defrosting operation, the first four-way valve 50 may be provided to guide the refrigerant compressed in the compressor 40 to the indoor unit 1b. During the heating operation or the sub-defrosting operation, the first four-way valve 50 may be provided to guide the refrigerant discharged from the outdoor heat exchanger 100 to the accumulator 80.

For example, the first four-way valve 50 may be controlled by a controller 700 to be described later. The first four-way valve 50 may be configured to change the flow direction of the refrigerant according to a control signal of the controller 700.

The outdoor unit 1a may include the second four-way valve 60 arranged between the compressor 40 and the outdoor heat exchanger 100. The second four-way valve 60 may be arranged between the discharge side 42 of the compressor 40 and the lower part 120 of the outdoor heat exchanger 100. The second four-way valve 60 may be arranged between one side branched from the discharge side 42 of the compressor 40 and the lower part 120 of the outdoor heat exchanger 100.

The D port D2 of the second four-way valve 60 may be connected to the discharge side 42 of the compressor 40. The D port D2 of the second four-way valve 60 may be connected to one side branched from the discharge side 42 of the compressor 40. The D port D2 of the second four-way valve 60 may be connected to the first line L1 extending from the discharge side 42 of the compressor 40. The S port S2 of the second four-way valve 60 may be connected to the suction side 81 of the accumulator 80. The S port S2 of the second four-way valve 60 may be connected to the second line L2 extending from the suction side 81 of the accumulator 80. The C port C2 of the second four-way valve 60 may be connected to the lower part 120 of the outdoor heat exchanger 100. The C port C2 of the second four-way valve 60 may be connected to a fifth line L5 extending from the lower part 120 of the outdoor heat exchanger 100. The E port E2 of the second four-way valve 60 may be provided to be closed.

The second four-way valve 60 may change the flow direction of the refrigerant. During the main defrosting operation or the sub-defrosting operation, the second four-way valve 60 may be provided to guide the refrigerant, which is compressed in the compressor 40, to the lower part 120 of the outdoor heat exchanger 100. During the heating operation, the second four-way valve 60 may be provided to guide the refrigerant, which is discharged from the outdoor heat exchanger 100, to the accumulator 80.

For example, the second four-way valve 60 may be controlled by the controller 700 to be described later. The second four-way valve 60 may be configured to change the flow direction of the refrigerant according to a control signal of the controller 700.

Meanwhile, referring to FIG. 6, the outdoor unit 1a may selectively include the second four-way valve 60. That is, the outdoor unit 1a may include the first four-way valve 50 and may not include the second four-way valve 60. At this time, the first four-way valve 50 is not limited to being arranged between the compressor 40 and the upper part 110 of the outdoor heat exchanger 100. For example, as long as the first four-way valve 50 is connected to the outdoor heat exchanger 100, the first four-way valve 50 may be arranged between the compressor 40 and the lower part 120 of the outdoor heat exchanger 100 or between the compressor 40 and a central part of the heat exchanger 100.

The outdoor unit 1a may include the expansion valve 70. The expansion valve 70 may be configured to depressurize the refrigerant. For example, the expansion valve 70 may be configured to depressurize the refrigerant flowing into or flowing out of the outdoor heat exchanger 100. The expansion valve 70 may be configured to adjust an amount of refrigerant.

The outdoor unit 1a may include the outdoor expansion valve 71. As described above, the expansion valve 70 may be arranged in at least one of the outdoor unit 1a and the indoor unit 1b. The expansion valve 70 arranged in the outdoor unit 1a may be referred to as an outdoor expansion valve 71. The expansion valve 70 arranged in the indoor unit 1b may be referred to as an indoor expansion valve 72. The air conditioner 1 may include at least one of the outdoor expansion valve 71 and the indoor expansion valve 72.

The expansion valve 70 may depressurize the refrigerant using a throttling action. The throttling action means that when the refrigerant passes through a narrow flow path, the pressure decreases without exchanging heat with the outside.

For example, the expansion valve 70 may be an electronic expansion valve (EEV) configured to adjust an opening degree.

The outdoor unit 1a may include the accumulator 80. The accumulator 80 may be configured to separate the refrigerant discharged from the outdoor heat exchanger 100 or the indoor heat exchanger 200 into a liquid refrigerant and a gas refrigerant and supply the refrigerant to the compressor 40. The accumulator 80 may separate a non-vaporized liquid refrigerant from the refrigerant flowing into the compressor 40 so as to prevent the liquid refrigerant from being transferred to the compressor 40.

The accumulator 80 may be arranged on the suction side 41 of the compressor 40. The suction side 81 of the accumulator 80 may be connected to the first four-way valve 50. The suction side 81 of the accumulator 80 may be connected to the second four-way valve 60. The discharge side 82 of the accumulator 80 may be connected to the suction side 41 of the compressor 40.

The accumulator 80 may include a level sensor 83. The level sensor 83 may detect a level of the liquid refrigerant stored in the accumulator 80. When the level of the liquid refrigerant accumulated in the accumulator 80 is higher than a predetermined reference level, the liquid refrigerant may flow into the compressor 40. When the liquid refrigerant flows into the compressor 40, the compressor 40 may be damaged. Accordingly, when the level of the liquid refrigerant detected by the level sensor 83 is higher than the reference level, the outdoor unit 1a may stop driving of the compressor 40 and drive the accumulator 80 to vaporize the liquid refrigerant.

The outdoor unit 1a may include the pipe valves 101 and 102. The outdoor unit 1a may include the pipe valve 101 connected to the first external pipe P1. The outdoor unit 1a may include the pipe valve 102 connected to the second external pipe P2.

The outdoor unit 1a may include a refrigerant pipe arranged inside the outdoor unit 1a and configured to allow the refrigerant to flow. The refrigerant pipe may be provided to connect components of the outdoor unit 1a. The refrigerant pipe of the outdoor unit 1a may be referred to as an internal pipe of the outdoor unit 1a.

The internal pipe of the outdoor unit 1a may include the first line L1. The first line L1 may extend from the discharge side 42 of the compressor 40. The refrigerant discharged from the compressor 40 may flow along the first line L1.

For example, the first line L1 may include a first connection pipe 91. For example, the first line L1 may include a second connection pipe 92. The first line L1 may branch into the first connection pipe 91 and the second connection pipe 92. The first connection pipe 91 may connect the compressor 40 and the first four-way valve 50. The first connection pipe 91 may connect the discharge side 42 of the compressor 40 and the D port D1 of the first four-way valve 50. The second connection pipe 92 may connect the compressor 40 and the second four-way valve 60. The second connection pipe 92 may connect the discharge side 42 of the compressor 40 and the D port D2 of the second four-way valve 60.

The internal pipe of the outdoor unit 1a may include the second line L2. The second line L2 may extend from the suction side 81 of the accumulator 80. The refrigerant sucked into the accumulator 80 may flow along the second line L2.

For example, the second line L2 may include a third connection pipe 93. For example, the second line L2 may include a fourth connection pipe 94. The third connection pipe 93 and the fourth connection pipe 94 may merge into the second line L2. The third connection pipe 93 may connect the first four-way valve 50 and the accumulator 80. The third connection pipe 93 may connect the S port S1 of the first four-way valve 50 and the suction side 81 of the accumulator 80. The fourth connection pipe 94 may connect the second four-way valve 60 and the accumulator 80. The fourth connection pipe 94 may connect the S port S2 of the second four-way valve 60 and the suction side 81 of the accumulator 80.

The internal pipe of the outdoor unit 1a may include a third line L3. The third line L3 may connect the compressor 40 and the accumulator 80. The third line L3 may connect the suction side 41 of the compressor 40 and the discharge side 82 of the accumulator 80. The refrigerant discharged from the accumulator 80 may flow along the third line L3.

The internal pipe of the outdoor unit 1a may include the fourth line L4. The fourth line L4 may connect the first four-way valve 50 and the outdoor heat exchanger 100. The fourth line L4 may connect the C port C1 of the first four-way valve 50 and the upper part 110 of the outdoor heat exchanger 100.

The internal pipe of the outdoor unit 1a may include the fifth line L5. The fifth line L5 may connect the second four-way valve 60 and the outdoor heat exchanger 100. The fifth line L5 may connect the C port C2 of the second four-way valve 60 and the lower part 120 of the outdoor heat exchanger 100.

The internal pipe of the outdoor unit 1a may include a sixth line L6. The sixth line L6 may connect the outdoor heat exchanger 100 and the expansion valve 70.

The internal pipe of the outdoor unit 1a may include a seventh line L7. The seventh line L7 may connect the expansion valve 70 and the first external pipe P1. The seventh line L7 may be connected to the first external pipe P1 through the pipe valve 101.

The internal pipe of the outdoor unit 1a may include the eighth line L8. The eighth line L8 may connect the first four-way valve 50 and the indoor unit 1b. The eighth line L8 may connect the E port E1 of the first four-way valve 50 and the second external pipe P2. The eighth line L8 may be connected to the second external pipe P2 through the pipe valve 102.

The outdoor unit 1a may include a first pressure sensor 410. The first pressure sensor 410 may be arranged on the discharge side 42 of the compressor 40. The first pressure sensor 410 may be arranged on the first line L1. The first pressure sensor 410 may be configured to detect a pressure of the refrigerant discharged from the compressor 40. The first pressure sensor 410 may detect a pressure of the refrigerant flowing through the first line L1.

The outdoor unit 1a may include a second pressure sensor 420. The second pressure sensor 420 may be arranged on the suction side 81 of the accumulator 80. The second pressure sensor 420 may be arranged on the second line L2. The second pressure sensor 420 may be configured to detect a pressure of the refrigerant flowing toward the accumulator 80. The second pressure sensor 420 may detect a pressure of the refrigerant flowing through the second line L2.

Although not shown in the drawings, the outdoor unit 1a may include various temperature sensors. The outdoor unit 1a may include a temperature sensor (not shown) configured to detect the temperature of the outdoor heat exchanger 100. For example, the outdoor unit 1a may include a temperature sensor (not shown) arranged around an inlet and/or outlet of the outdoor heat exchanger 100. For example, the outdoor unit 1a may include a temperature sensor (not shown) arranged on at least one of the fourth line L4, the fifth line L5, and the sixth line L6. The outdoor unit 1a may include a temperature sensor (not shown) arranged on the discharge side 42 of the compressor 40 to detect a temperature of the refrigerant discharged from the compressor 40. In addition, the outdoor unit 1a may include a temperature sensor configured to detect a temperature at various points.

The outdoor unit 1a may include the defrost pipe 300. The defrost pipe 300 may be arranged on the base 15. The defrost pipe 300 may be installed in the base 15. The defrost pipe 300 may be provided to be in contact with the base 15. The defrost pipe 300 may be referred to as a base pipe 300.

The defrost pipe 300 may be configured to supply heat of the refrigerant discharged from the compressor 40 to the base 15. That is, the refrigerant discharged from the compressor 40 may be provided to transfer heat to the base 15 while flowing along the defrost pipe 300.

One end of the defrost pipe 300 may be connected to the discharge side 42 of the compressor 40. The other end of the defrost pipe 300 may be connected between the outdoor heat exchanger 100 and the expansion valve 70. For example, the other end of the defrost pipe 300 may be connected to the sixth line L6. A pressure at the other end of the defrost pipe 300 may be lower than a pressure at one end of the defrost pipe 300. Accordingly, the refrigerant discharged from the compressor 40 may flow from the one end of the defrost pipe 300 toward the other end of the defrost pipe 300.

For example, the defrost pipe 300 may be provided to branch from a connection point 90 of the first connection pipe 91 and the second connection pipe 92. For example, at the discharge side 42 of the compressor 40, the defrost pipe 300 may be provided to bypass the first four-way valve 50 and the second four-way valve 60.

For example, frost may be generated in the outdoor heat exchanger during the heating operation of the air conditioner. When the frost is generated in the outdoor heat exchanger, a heating performance of the air conditioner may deteriorate and product reliability may decrease. In order to remove the frost generated in the outdoor heat exchanger, the defrosting operation may be performed after the heating operation is temporarily stopped. At this time, water (defrost water), which is generated as the frost melts in the heat exchanger, may collect and freeze on the base of the outdoor unit. For example, condensed water generated in the outdoor heat exchanger during the operation of the refrigeration cycle may accumulate and freeze on the base. For example, moisture may permeate into the outdoor unit and freeze on the base due to an external environment (e.g., when it rains or snows). That is, freezing of the base may occur as the water freezes on the base due to various factors. In addition, when the base freezes, the base hole may be blocked and a drainage performance of the outdoor unit may deteriorate.

In order to prevent freezing of the base, a heater configured to heat the base and a control device configured to supply electricity to the heater may be required. When the air conditioner includes a separate heater and a control device, electricity consumption of the air conditioner may increase. That is, the energy efficiency of the air conditioner may decrease.

However, according to the disclosure, the air conditioner 1 may include the defrost pipe 300. The outdoor unit 1a may include the defrost pipe 300. The defrost pipe 300 may prevent freezing of the base 15 by using heat of the refrigerant discharged from the compressor 40. In addition, blocking of the base hole 151 may be prevented. For example, the refrigerant flowing along the defrost pipe 300 may be provided to change not only in temperature but also in phase. That is, the defrost pipe 300 may exchange heat with the base 15 using latent heat as well as dedicated heat, and thus the heat exchange performance may be effective. As a result, it is not required for the air conditioner 1 to include a separate heater and control device. The air conditioner 1 may minimize cost and/or power consumption caused by the use of the heater and the control device.

The outdoor unit 1a may include a defrost valve 310 arranged on the defrost pipe 300. The defrost valve 310 may be configured to adjust a flow rate of the refrigerant flowing through the defrost pipe 300. The defrost valve 310 may be configured to open and close the defrost pipe 300. The defrost valve 310 may be referred to as a base pipe valve 310.

The defrost valve 310 may be controlled by the controller 700. The controller 700 may be configured to control an opening degree of the defrost valve 310. The controller 700 may be configured to control opening and closing of the defrost valve 310.

The defrost valve 310 may be controlled by the controller 700 based on information from the temperature sensor. For example, the defrost valve 310 may be controlled by the controller 700 based on a measurement value (first temperature value) of a first temperature sensor 321 to be described later. The defrost valve 310 may be controlled by the controller 700 based on a measurement value (second temperature value) of a second temperature sensor 321 to be described later. A detailed description thereof will be described later.

For example, the defrost valve 310 may be an electronic expansion valve (EEV) configured to adjust an opening degree.

The outdoor unit 1a may include the first temperature sensor 321 configured to detect the temperature of the defrost pipe 300. The first temperature sensor 321 may be arranged in the defrost pipe 300. However, it is not limited thereto, and the first temperature sensor 321 may be arranged around the defrost pipe 300 to detect the temperature around the defrost pipe 300. The first temperature sensor 321 may be referred to as a pipe temperature sensor 321.

The outdoor unit 1a may include the second temperature sensor 322 configured to detect an outdoor temperature. The second temperature sensor 322 may be referred to as an outside air temperature sensor 322. The second temperature sensor 322 may be referred to as an outdoor temperature sensor 322.

For example, the first temperature sensor 321 may be arranged upstream of the defrost valve 310 in the defrost pipe 300. The first temperature sensor 321 may be arranged upstream of the defrost valve 310 based on the flow direction of the refrigerant in the defrost pipe 300. The defrost valve 310 may be arranged closer to the other end of the defrost pipe 300 than the first temperature sensor 321. For example, the defrost valve 310 may be controlled based on a value detected by the first temperature sensor 321. That is, the defrost valve 310 is controlled based on the information detected by the first temperature sensor 321, and thus it is appropriate that the first temperature sensor 321 is arranged upstream of the defrost valve 310 on the flow of the refrigerant. With this arrangement, the control of the refrigerant flow rate of the defrost valve 310 may be more easily performed. However, a case in which the first temperature sensor 321 is arranged downstream of the defrost valve 310 in the defrost pipe 300 is not excluded. For example, by adjusting the connection line inside the outdoor unit 1a or by changing/adding components, the first temperature sensor 321 may be arranged downstream of the defrost valve 310 in the defrost pipe 300.

The air conditioner 1 may effectively defrost the outdoor heat exchanger 100 by including the first four-way valve 50 and the second four-way valve 60. The air conditioner 1 may completely defrost up to the lower part 120 of the outdoor heat exchanger 100. The air conditioner 1 may effectively defrost the outdoor heat exchanger 100 and prevent freezing of the base 15. Details thereof will be described later.

The main defrosting operation of the air conditioner will be described with reference to FIG. 8. The main defrosting operation may refer to an operation for defrosting the entire outdoor heat exchanger 100. The main defrosting operation may mean an operation for defrosting the upper part 110 of the outdoor heat exchanger 100 and the lower part of the outdoor heat exchanger 100. The main defrosting operation may be referred to as a first defrosting operation.

During the main defrosting operation, the outdoor heat exchanger 100 may operate as a condenser. During the main defrosting operation, the indoor heat exchanger 200 may operate as an evaporator.

During the main defrosting operation, the D port D1 of the first four-way valve 50 and the C port C1 of the first four-way valve 50 may be connected, and the E port E1 of the first four-way valve 50 and the S port S1 of the first four-way valve 50 may be connected. During the main defrosting operation, the D port D2 of the second four-way valve 60 and the C port C2 of the second four-way valve 60 may be connected.

The refrigerant discharged from the compressor 40 may flow to the first four-way valve 50. The refrigerant discharged from the compressor 40 may flow to the D port D1 of the first four-way valve 50. The refrigerant flowing into the D port D1 of the first four-way valve 50 may flow out to the C port C1 of the first four-way valve 50.

The refrigerant discharged from the C port C1 of the first four-way valve 50 may be supplied to the upper part 110 of the outdoor heat exchanger 100. That is, the first four-way valve 50 may be configured to supply the refrigerant discharged from the compressor 40 to the upper part 110 of the outdoor heat exchanger 100. The upper part 110 of the outdoor heat exchanger 100 may release heat as the upper part 110 of the outdoor heat exchanger 100 operates as a condenser. Accordingly, the upper part 110 of the outdoor heat exchanger 100 may be defrosted.

The refrigerant discharged from the compressor 40 may flow to the second four-way valve 60. The refrigerant discharged from the compressor 40 may flow to the D port D2 of the second four-way valve 60. The refrigerant flowing into the D port D2 of the second four-way valve 60 may flow out to the C port C2 of the second four-way valve 60. The refrigerant discharged from the C port C2 of the second four-way valve 60 may be supplied to the lower part 120 of the outdoor heat exchanger 100. That is, the second four-way valve 60 may be configured to supply the refrigerant discharged from the compressor 40 to the lower part 120 of the outdoor heat exchanger 100. The lower part 120 of the outdoor heat exchanger 100 may release heat as the lower part 120 of the outdoor heat exchanger 100 operates as a condenser. Accordingly, the lower part 120 of the outdoor heat exchanger 100 may be defrosted.

The refrigerant discharged from the compressor 40 may flow into the defrost pipe 300. The refrigerant discharged from the compressor 40 may be provided to transfer heat to the base 15 while flowing along the defrost pipe 300. The refrigerant discharged from the compressor 40 may flow from the discharge side 42 of the compressor 40 to between the outdoor heat exchanger 100 and the expansion valve 70. Accordingly, water (e.g., defrost water, condensed water, etc.) on the base 15 may not freeze due to the heat of the refrigerant flowing through the defrost pipe 300. For example, during the main defrosting operation, the defrost valve 310 may be opened.

The refrigerant discharged from the outdoor heat exchanger 100 may flow to the expansion valve 70. The refrigerant decompressed by the expansion valve 70 may flow into the indoor heat exchanger 200. The indoor heat exchanger 200 may absorb heat as the indoor heat exchanger 200 operates as an evaporator. The refrigerant discharged from the indoor heat exchanger 200 may flow into the E port E1 of the first four-way valve 50. The refrigerant flowing into the E port E1 of the first four-way valve 50 may flow out to the S port S1 of the first four-way valve 50. The refrigerant discharged from the S port S1 of the first four-way valve 50 may flow to the suction side 81 of the accumulator 80. The refrigerant discharged from the discharge side 82 of the accumulator 80 may flow to the suction side 41 of the compressor 40. The refrigerant discharged from the discharge side 42 of the compressor 40 may flow toward the first four-way valve 50, the second four-way valve 60, and the defrost pipe 300 again.

During the main defrosting operation, the air conditioner 1 may prevent the base 15 from freezing while defrosting the upper part 110 and the lower part 120 of the outdoor heat exchanger 100. The air conditioner 1 may supply hot gas to the entire outdoor heat exchanger 100 and simultaneously move the hot gas to the base 15, thereby preventing the base hole 151 from being clogged.

Meanwhile, the flow direction of the refrigerant during the main defrosting operation of the air conditioner 1 may be the same as the flow direction of the refrigerant during the cooling operation.

The heating operation of the air conditioner will be described with reference to FIG. 9. The heating operation may refer to an operation for heating an indoor space in which the indoor unit 1b is arranged.

During the heating operation, the outdoor heat exchanger 100 may operate as an evaporator. During the heating operation, the indoor heat exchanger 200 may operate as a condenser.

During the heating operation, the D port D1 of the first four-way valve 50 and the E port E1 of the first four-way valve 50 may be connected, and the C port C1 of the first four-way valve 50 and the S port S1 of the four-way valve 50 may be connected. During the heating operation, the C port C2 of the second four-way valve 60 and the S port S2 of the second four-way valve 60 may be connected.

The refrigerant discharged from the compressor 40 may flow to the first four-way valve 50. The refrigerant discharged from the compressor 40 may flow to the D port D1 of the first four-way valve 50. The refrigerant flowing into the D port D1 of the first four-way valve 50 may flow out to the E port E1 of the first four-way valve 50.

The refrigerant discharged from the compressor 40 may not flow to the second four-way valve 60.

The refrigerant discharged from the compressor 40 may flow into the defrost pipe 300. The refrigerant discharged from the compressor 40 may be provided to transfer heat to the base 15 while flowing along the defrost pipe 300. The refrigerant discharged from the compressor 40 may flow from the discharge side 42 of the compressor 40 to between the outdoor heat exchanger 100 and the expansion valve 70. Accordingly, water (e.g., defrost water, condensed water, etc.) on the base 15 may not freeze due to the heat of the refrigerant flowing through the defrost pipe 300. For example, during the heating operation, the defrost valve 310 may be opened and closed based on the measured value of the first temperature sensor 321 and/or the measured value of the second temperature sensor 322. For example, during the heating operation, the opening degree of the defrost valve 310 may be adjusted based on the measured value of the first temperature sensor 321 and/or the measured value of the second temperature sensor 322. Details thereof will be described later (refer to FIGS. 14 to 19).

The refrigerant discharged from the E port E1 of the first four-way valve 50 may flow to the indoor unit 1b. The refrigerant discharged from the first four-way valve 50 may flow into the indoor heat exchanger 200 of the indoor unit 1b. The indoor heat exchanger 200 may release heat as the indoor heat exchanger 200 operates as a condenser. Accordingly, heating of the indoor space may be performed.

The refrigerant discharged from the indoor heat exchanger 200 may flow to the expansion valve 70. The refrigerant decompressed by the expansion valve 70 may flow into the outdoor heat exchanger 100.

The refrigerant discharged from the outdoor heat exchanger 100 may flow to the first four-way valve 50. The refrigerant discharged from the outdoor heat exchanger 100 may flow to the C port C1 of the first four-way valve 50. The refrigerant flowing into the C port C1 of the first four-way valve 50 may flow out to the S port S1 of the first four-way valve 50.

The refrigerant discharged from the outdoor heat exchanger 100 may flow to the second four-way valve 60. The refrigerant discharged from the outdoor heat exchanger 100 may flow to the C port C2 of the second four-way valve 60. The refrigerant flowing into the C port C2 of the second four-way valve 60 may flow out to the S port S2 of the second four-way valve 60.

The refrigerant discharged from the S port S1 of the first four-way valve 50 and the refrigerant discharged from the S port S2 of the second four-way valve 60 may flow to the suction side 81 of the accumulator 80. The refrigerant discharged from the discharge side 82 of the accumulator 80 may flow to the suction side 41 of the compressor 40. The refrigerant discharged from the discharge side 42 of the compressor 40 may flow to the first four-way valve 50 and the defrost pipe 300 again.

The air conditioner 1 may prevent the base 15 from freezing during the heating operation. The air conditioner 1 may prevent the base hole 151 from being clogged by moving hot gas to the base 15 not only during the defrosting operation but also during the heating operation.

The sub-defrosting operation of the air conditioner will be described with reference to FIG. 10. In general, the ice of the upper part 110 of the outdoor heat exchanger 100 may be melted first, and the ice of the lower part 120 of the outdoor heat exchanger 100 may be melted last. Accordingly, the lower part 120 of the outdoor heat exchanger 100 may not be completely defrosted. Accordingly, the sub-defrosting operation may refer to an operation for additionally defrosting the lower part 120 of the outdoor heat exchanger 100 in order to completely defrost the outdoor heat exchanger 100. The sub defrosting operation may be referred to as a second defrosting operation.

During the sub-defrosting operation, the upper part 110 of the outdoor heat exchanger 100 may operate as an evaporator. During the sub-defrosting operation, the lower part 120 of the outdoor heat exchanger 100 may operate as a condenser. During the sub-defrosting operation, the indoor heat exchanger 200 may operate as a condenser.

During the sub-defrosting operation, the D port D1 of the first four-way valve 50 and the E port E1 of the first four-way valve 50 may be connected, and the C port C1 of the first four-way valve 50 and the S port S1 of the first four-way valve 50 may be connected. During the sub-defrosting operation, the D port D2 of the second four-way valve 60 and the C port C2 of the second four-way valve 60 may be connected.

The refrigerant discharged from the compressor 40 may flow to the first four-way valve 50. The refrigerant discharged from the compressor 40 may flow to the D port D1 of the first four-way valve 50. The refrigerant flowing into the D port D1 of the first four-way valve 50 may flow out to the E port E1 of the first four-way valve 50.

The refrigerant discharged from the compressor 40 may flow to the second four-way valve 60. The refrigerant discharged from the compressor 40 may flow to the D port D2 of the second four-way valve 60. The refrigerant flowing into the D port D2 of the second four-way valve 60 may flow out to the C port C2 of the second four-way valve 60. The refrigerant discharged from the C port C2 of the second four-way valve 60 may be supplied to the lower part 120 of the outdoor heat exchanger 100. That is, the second four-way valve 60 may be configured to supply the refrigerant discharged from the compressor 40 to the lower part 120 of the outdoor heat exchanger 100. The lower part 120 of the outdoor heat exchanger 100 may release heat as the lower part 120 of the outdoor heat exchanger 100 operates as a condenser. Accordingly, the lower part 120 of the outdoor heat exchanger 100 may be defrosted. That is, during the sub-defrosting operation, the lower part 120 of the outdoor heat exchanger 100 that is not completely defrosted may be additionally defrosted.

The refrigerant discharged from the compressor 40 may flow into the defrost pipe 300. The refrigerant discharged from the compressor 40 may be provided to transfer heat to the base 15 while flowing along the defrost pipe 300. The refrigerant discharged from the compressor 40 may flow from the discharge side 42 of the compressor 40 to between the outdoor heat exchanger 100 and the expansion valve 70. Accordingly, water (e.g., defrost water, condensed water, etc.) on the base 15 may not freeze due to the heat of the refrigerant flowing through the defrost pipe 300. For example, during the sub-defrosting operation, the defrost valve 310 may be opened.

The refrigerant discharged from the E port E1 of the first four-way valve 50 may flow to the indoor unit 1b. The refrigerant discharged from the first four-way valve 50 may flow into the indoor heat exchanger 200 of the indoor unit 1b.

The refrigerant discharged from the indoor heat exchanger 200 may flow to the expansion valve 70. The refrigerant decompressed by the expansion valve 70 may flow into the outdoor heat exchanger 100.

The refrigerant discharged from the outdoor heat exchanger 100 may flow to the first four-way valve 50. The refrigerant discharged from the outdoor heat exchanger 100 may flow to the C port C1 of the first four-way valve 50. The C port C1 of the first four-way valve 50 may be connected to the S port S1 of the first four-way valve 50. The refrigerant flowing into the C port C1 of the first four-way valve 50 may flow out to the S port S1 of the first four-way valve 50.

The refrigerant discharged from the S port S1 of the first four-way valve 50 may flow to the suction side 81 of the accumulator 80. The refrigerant discharged from the discharge side 82 of the accumulator 80 may flow to the suction side 41 of the compressor 40. The refrigerant discharged from the discharge side 42 of the compressor 40 may flow toward the first four-way valve 50, the second four-way valve 60, and the defrost pipe 300 again.

The air conditioner 1 may prevent the base 15 from freezing while defrosting the lower part 120 of the outdoor heat exchanger 100 during the sub-defrosting operation. The air conditioner 1 may supply hot gas to the lower part 120 of the outdoor heat exchanger 100 and simultaneously move the hot gas to the base 15, thereby preventing the base hole 151 from being clogged.

Figure 11:
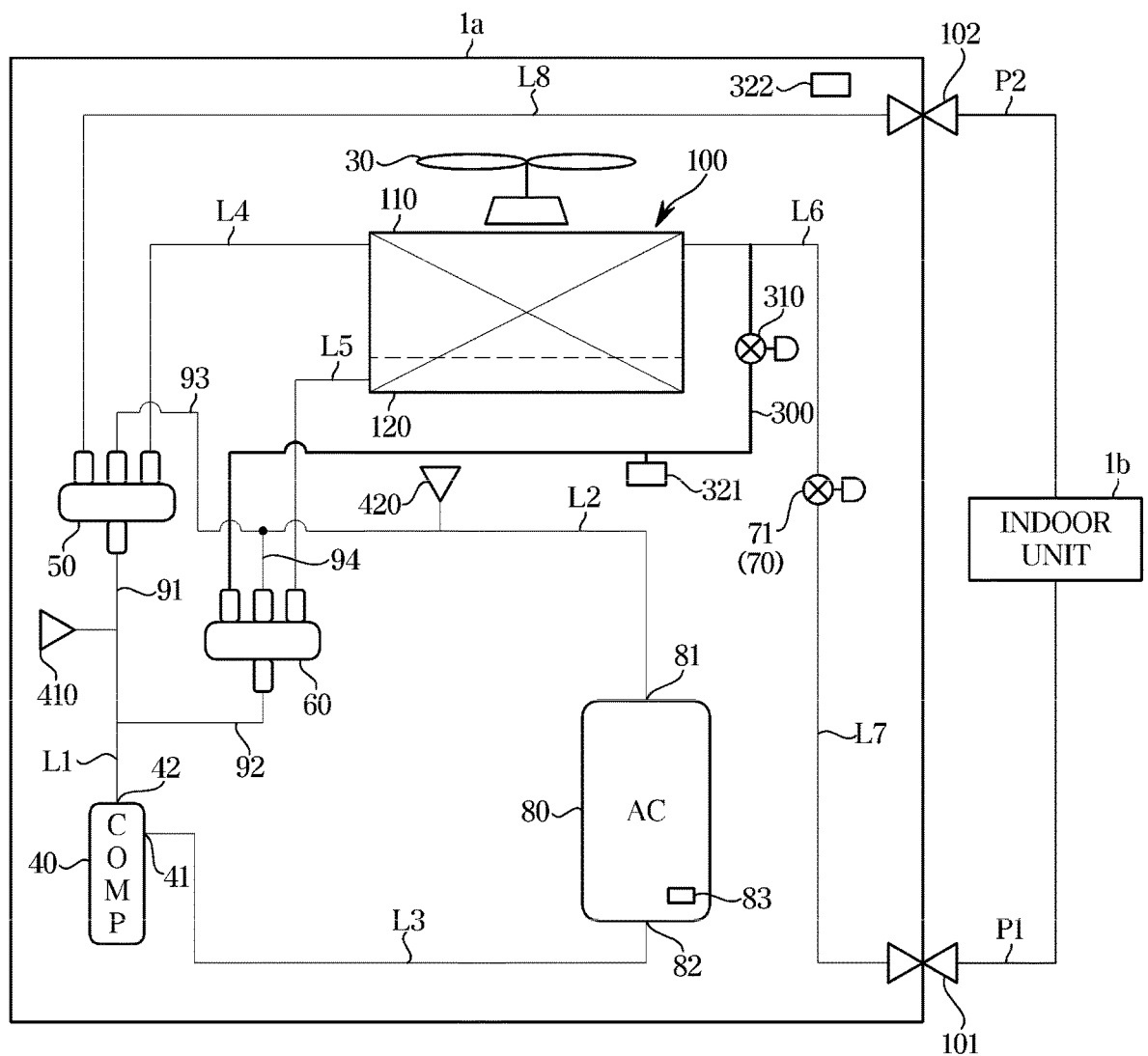
FIG. 11 is a diagram schematically illustrating an example of an air conditioner according to an embodiment of the disclosure.
Figure 12:
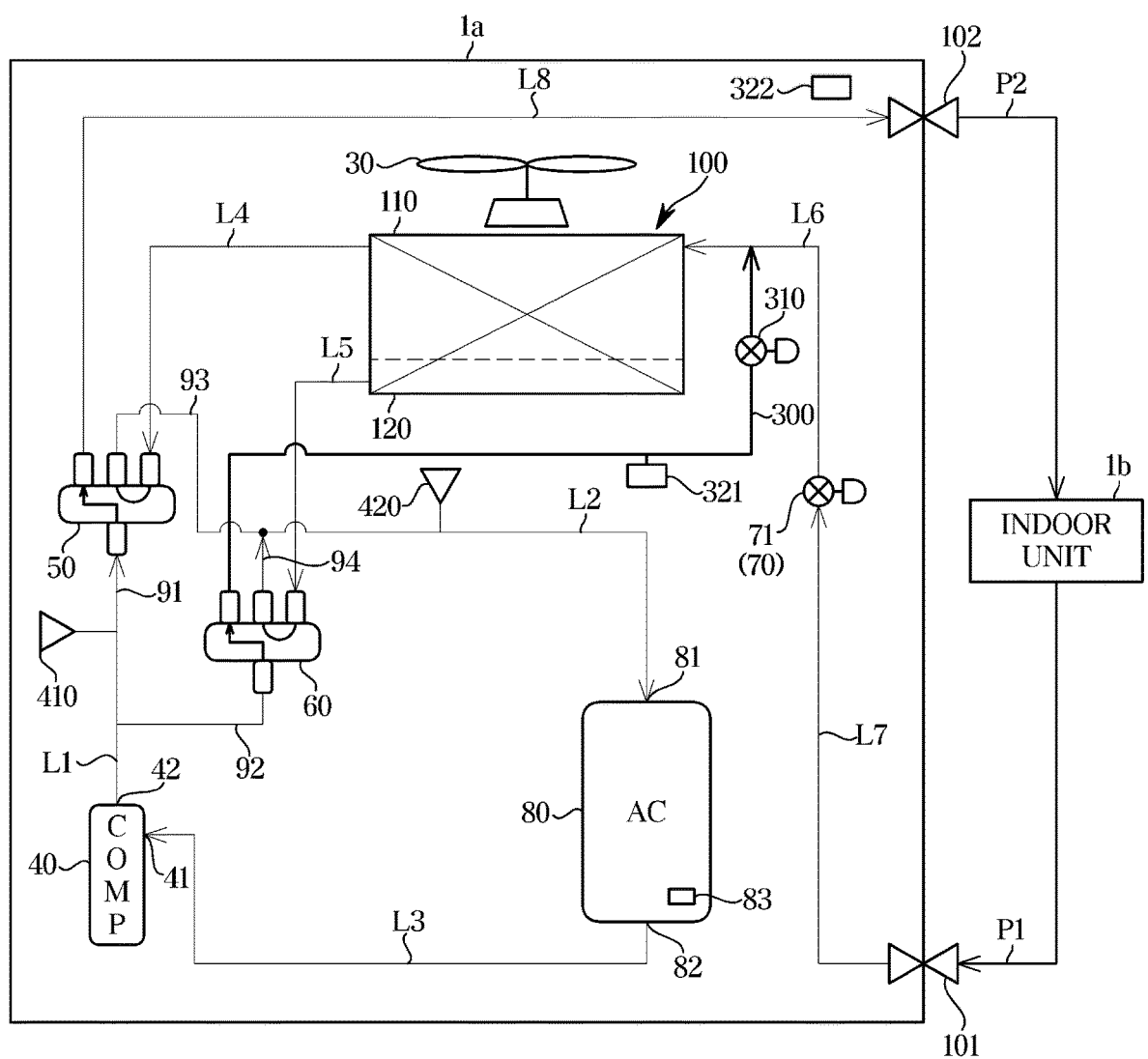
FIG. 12 is a diagram schematically illustrating a flow of a refrigerant during a heating operation of the air conditioner shown in FIG. 11 according to an embodiment of the disclosure.

FIG. 11 is a diagram schematically illustrating an example of an air conditioner according to an embodiment. FIG. 12 is a diagram schematically illustrating a flow of a refrigerant during a heating operation of the air conditioner shown in FIG. 11.

An example of the air conditioner 1 shown in FIGS. 11 and 12 may include a connection to the defrost pipe 300 that is different from the example of the air conditioner 1 shown in FIGS. 6 to 10. Otherwise, an example of the air conditioner 1 shown in FIGS. 11 and 12 may include the same configuration. The same components may include the same reference numerals, and duplicate descriptions may be omitted.

Referring to FIG. 11, one end of the defrost pipe 300 may be connected to the second four-way valve 60. One end of the defrost pipe 300 may be connected to one port of the second four-way valve 60. One end of the defrost pipe 300 may be connected to the E port E2 of the second four-way valve 60. One end of the defrost pipe 300 may extend from the E port E2 of the second four-way valve 60. The other end of the defrost pipe 300 may be arranged between the outdoor heat exchanger 100 and the expansion valve 70.

The refrigerant discharged from the compressor 40 may be provided to flow into the defrost pipe 300 via the second four-way valve 60. The refrigerant discharged from the compressor 40 and passed through the second four-way valve 60 may flow in the defrost pipe 300.

The flow of the refrigerant flowing through the defrost pipe 300 during the heating operation of the air conditioner will be described with reference to FIG. 12. The flow of the refrigerant in other components has been described above, and thus, detailed descriptions thereof are omitted.

During the heating operation, the outdoor heat exchanger 100 may operate as an evaporator. During the heating operation, the indoor heat exchanger 200 may operate as a condenser.

During the heating operation, the D port D1 of the first four-way valve 50 and the E port E1 of the first four-way valve 50 may be connected, and the C port C1 of the first four-way valve 50 and the S port S1 of the four-way valve 50 may be connected. During the heating operation, the D port D2 of the second four-way valve 60 and the E port E2 of the second four-way valve 60 may be connected, and the C port C2 of the second four-way valve 60 and the S port S2 of the second four-way valve 60 may be connected.

The refrigerant discharged from the compressor 40 may flow to the second four-way valve 60. The refrigerant discharged from the compressor 40 may flow to the D port D2 of the second four-way valve 60. The refrigerant flowing into the D port D2 of the second four-way valve 60 may flow out to the E port E2 of the second four-way valve 60. The refrigerant discharged from the E port E2 of the second four-way valve 60 may flow into the defrost pipe 300. That is, the refrigerant discharged from the compressor 40 may flow into the defrost pipe 300 after passing through the second four-way valve 60. The refrigerant discharged from the compressor 40 may transfer heat to the base 15 while flowing along the defrost pipe 300. The refrigerant discharged from the compressor 40 may flow from the second four-way valve 60 toward between the outdoor heat exchanger 100 and the expansion valve 70. Accordingly, water (e.g., defrost water, condensed water, etc.) on the base 15 may not freeze due to the heat of the refrigerant flowing through the defrost pipe 300.

However, during the main defrosting operation or the sub-defrosting operation, the refrigerant discharged from the compressor 40 may flow into the D port D2 of the second four-way valve 60 and flow out to the C port C2 of the second four-way valve 60. Accordingly, the refrigerant may not flow to the defrost pipe 300.

Figure 13:
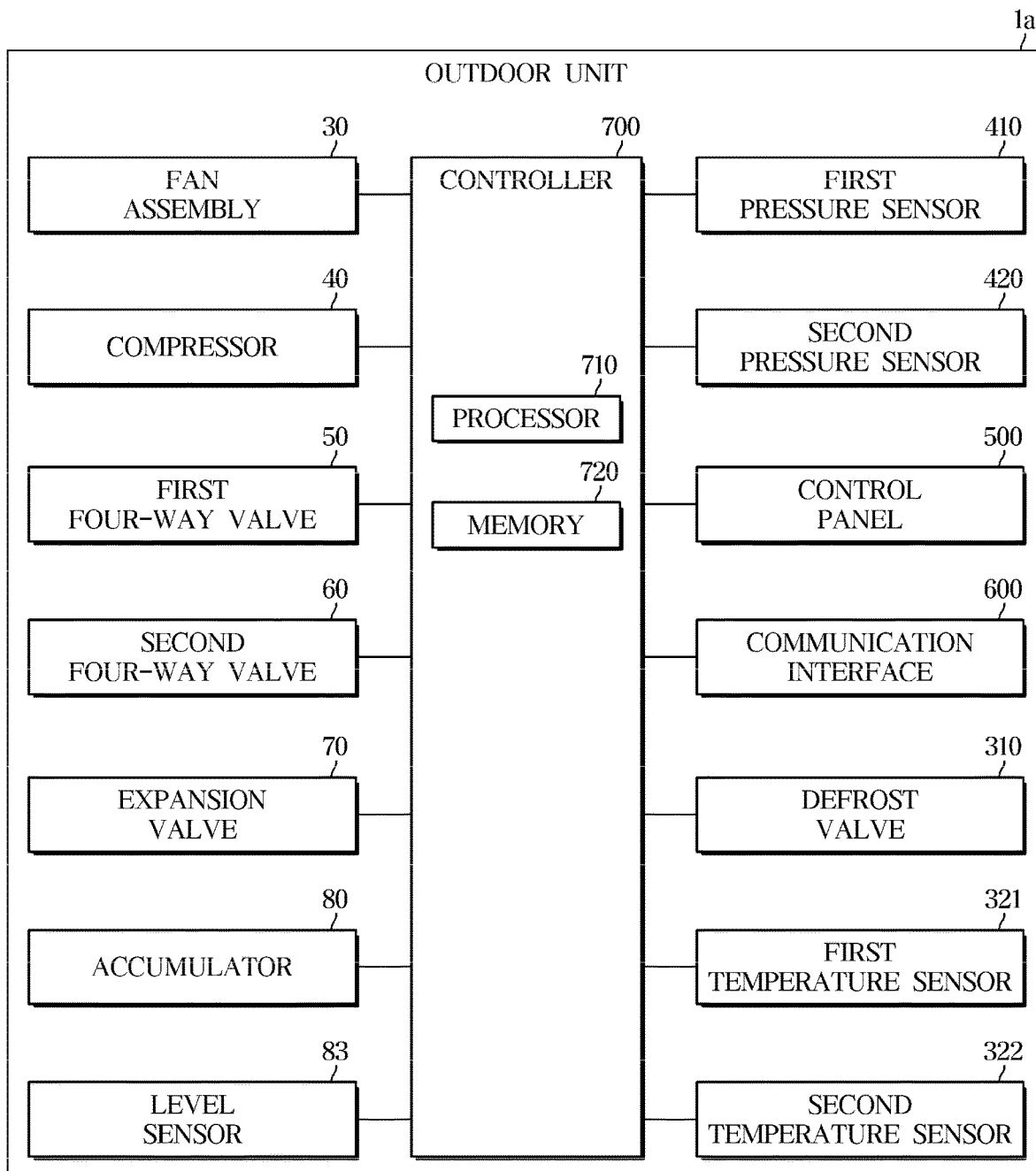
FIG. 13 is a control block diagram of an outdoor unit according to an embodiment of the disclosure.

FIG. 13 is a control block diagram of an outdoor unit according to an embodiment.

Referring to FIG. 13, the outdoor unit 1a may include the fan assembly 30. The outdoor unit 1a may include the compressor 40. The outdoor unit 1a may include the first four-way valve 50. The outdoor unit 1a may include the second four-way valve 60. The outdoor unit 1a may include the expansion valve 70. The outdoor unit 1a may include the accumulator 80. The outdoor unit 1a may include the level sensor 83. The outdoor unit 1a may include the first pressure sensor 410. The outdoor unit 1a may include the second pressure sensor 420. The outdoor unit 1a may include a control panel 500. The outdoor unit 1a may include a communication interface 600. The outdoor unit 1a may include the defrost valve 310. The outdoor unit 1a may include the first temperature sensor 321. The outdoor unit 1a may include the second temperature sensor 322. The outdoor unit 1a may include the controller 700 electrically connected to the components of the outdoor unit 1a and configured to control each component.

However, each component of the outdoor unit 1a shown in FIG. 13 may be omitted according to embodiments, and components not shown in FIG. 13 may also be included according to embodiments.

The controller 700 may be configured to control the fan assembly 30. The controller 700 may be configured to adjust the rotational speed of the fan assembly 30. For example, the controller 700 may be configured to adjust the rotational speed of the fan assembly 30 according to the outdoor temperature. For example, the controller 700 may be configured to adjust the rotational speed of the fan assembly 30 according to the temperature of the outdoor heat exchanger 100.

The controller 700 may be configured to control the compressor 40. The controller 700 may be configured to adjust the operating frequency of the compressor 40. The compressor 40 may discharge a high-temperature and high-pressure gaseous refrigerant (hot gas) in response to a control signal of the controller 700.

The controller 700 may be configured to control the first four-way valve 50. The first four-way valve 50 may be configured to change the circulation direction of the refrigerant in response to a control signal of the controller 700. For example, during the main defrosting operation, the first four-way valve 50 may be controlled to connect the D port D1 and the C port C1 and connect the E port E1 and the S port S1. For example, during the heating operation or the sub-defrosting operation, the first four-way valve 50 may be controlled to connect the D port D1 and the E port E1 and connect the C port C1 and the S port S1.

The controller 700 may be configured to control the second four-way valve 60. The second four-way valve 60 may be configured to change the circulation direction of the refrigerant in response to a control signal of the controller 700. For example, during the main defrosting operation or the sub defrosting operation, the second four-way valve 60 may be controlled to connect the D port D2 and the C port C2. For example, during heating operation, the second four-way valve 60 may be controlled to connect the C port C2 and the S port S2.

For example, when one end of the defrost pipe 300 is connected to the E port E2 of the second four-way valve 60 (refer to FIGS. 11 and 12), the second four-way valve 60 may be controlled to connect the C port C2 and the S port S2 and connect the D port D2 and the E port E2 during the heating operation.

The controller 700 may be configured to control the expansion valve 70. The controller 700 may control opening and closing of the expansion valve 70. The controller 700 may adjust the opening degree of the expansion valve 70. The expansion valve 70 may be controlled to adjust the amount of refrigerant supplied to the outdoor heat exchanger 100 or the indoor heat exchanger 200 in response to a control signal of the controller 700.

The controller 700 may determine that the liquid refrigerant flows into the compressor 40 based on the level of the liquid refrigerant, which is detected by the level sensor 83, being higher than a predetermined reference level. The controller 700 may stop the operation of the compressor 40 when it is determined that the liquid refrigerant flows into the compressor 40. Further, the controller 700 may control the accumulator 80 to vaporize the liquid refrigerant.

The first pressure sensor 410 may detect a pressure of the refrigerant on the discharge side 42 of the compressor 40. The first pressure sensor 410 may measure the pressure of the refrigerant flowing through the first line L1. The first pressure sensor 410 may transmit an electrical signal corresponding to the detected first pressure value to the controller 700.

The second pressure sensor 420 may detect a pressure of the refrigerant on the suction side 81 of the accumulator 80. The second pressure sensor 420 may measure the pressure of the refrigerant flowing through the second line L2. The second pressure sensor 420 may transmit an electrical signal corresponding to the detected second pressure value to the controller 700.

The control panel 500 may obtain a user input related to the operation of the air conditioner 1 and output information about the operation of the air conditioner 1. The control panel 500 may transmit an electrical signal (voltage or current) corresponding to a user input to the controller 700. The controller 700 may control the operation of the air conditioner 1 based on the electrical signal transmitted from the control panel 500. The controller 700 may control the operation of the outdoor unit 1*a* based on the electric signal transmitted from the control panel 500. For example, the control panel 500 may be arranged on one surface of the cabinet 10 of the outdoor unit 1*a*.

For example, the control panel 500 may include a plurality of buttons. The plurality of buttons may include a push switch and a membrane switch operated by being pressed by a user, and/or a touch switch operated by a user's body part contact. As one example of the plurality of buttons, a test operation button (not shown) for inputting a test operation command of the air conditioner 1 may be provided.

For example, the control panel 500 may include a display. The control panel 500 may display information input by a user or information provided to a user on various screens. On the display, the control panel 500 may output information such as an error message, a test operation progress rate, and a test operation result generated during the test operation of the air conditioner 1.

For example, the control panel 500 may include various types of display panels. The control panel 500 may include at least one of a Liquid Crystal Display Panel (LCD Panel), a Light Emitting Diode Panel (LED Panel), an Organic Light Emitting Diode Panel (OLED Panel), or a micro LED. The control panel 500 may be implemented as a touch display. The touch display may include a display panel displaying an image and a touch panel receiving a touch input. When the control panel 500 is provided as a touch display, separate buttons may be omitted.

For example, the control panel 500 may be configured to receive a predetermined first reference temperature from a user for comparison with a temperature detected by the first temperature sensor 321. The user may set the first reference temperature through the control panel 500.

For example, the control panel 500 may be configured to receive a predetermined second reference temperature from a user for comparison with a temperature detected by the second temperature sensor 322. The user may set the second reference temperature through the control panel 500.

The communication interface 600 may communicate with the indoor unit 1*b*. The communication interface 600 of the outdoor unit 1*a* may transmit a control signal transmitted from the controller 700 to the indoor unit 1*b* or transmit a control signal transmitted from the indoor unit 1*b* to a processor 710. In other words, the outdoor unit 1*a* and the indoor unit 1*b* may perform bi-directional communication. During the operation, the outdoor unit 1*a* and the indoor unit 1*b* may transmit and receive various signals.

The controller 700 may control the defrost valve 310. The defrost valve 310 may operate in response to a control signal of the controller 700. The controller 700 may control opening and closing of the defrost valve 310. The controller 700 may control the opening degree of the defrost valve 310. The controller 700 may control the amount of refrigerant flowing through the defrost pipe 300 by controlling the defrost valve 310.

The first temperature sensor 321 may be installed in the defrost pipe 300. The first temperature sensor 321 may detect the temperature of the defrost pipe 300. The first temperature sensor 321 may transmit an electrical signal corresponding to the detected first temperature value to the controller 700. The controller 700 may control the defrost valve 310 based on the first temperature value of the first temperature sensor 321.

The second temperature sensor 322 may detect an outdoor temperature. The location of the second temperature sensor 322 may vary as long as the second temperature sensor 322 is configured to measure the outdoor temperature. The second temperature sensor 322 may transmit an electrical signal corresponding to the detected second temperature value to the controller 700. The controller 700 may control the defrost valve 310 based on the second temperature value of the second temperature sensor 322.

The controller 700 may include the processor 710 and a memory 720. The processor 710 may generate a control signal for controlling the operation of the air conditioner 1 based on instructions, applications, data, and/or programs stored in the memory 720. The processor 710 is hardware and may include a logic circuit and an arithmetic circuit. The processor 710 may process data according to a program and/or instructions provided from the memory 720 and generate a control signal according to a processing result. The memory 720 and the processor 710 may be implemented as one control circuit or as a plurality of circuits.

The memory 720 may memorize/store various types of information necessary for the operation of the air conditioner 1. The memory 720 may store instructions, applications, data and/or programs necessary for the operation of the air conditioner 1. For example, the memory 720 may store a program for the test operation of the air conditioner 1.

For example, the memory 720 may include a volatile memory such as a static random access memory (S-RAM) and a dynamic random access memory (D-RAM) for temporarily storing data. For example, the memory 720 may include a non-volatile memory such as a read only memory (ROM), an erasable programmable read only memory (EPROM), and an electrically erasable programmable read only memory (EEPROM) for long-term storage of data. In addition, the memory 720 may include various types of previously known memories.

Figure 14:
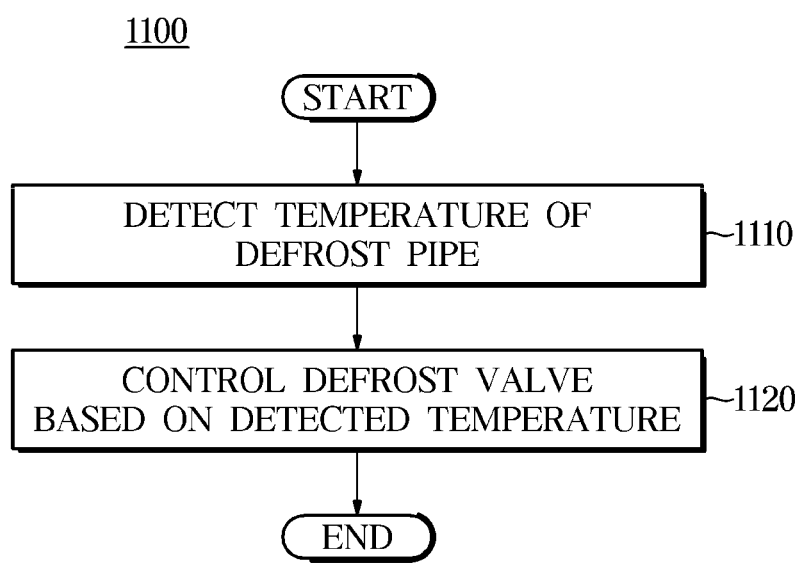
FIG. 14 illustrates an example of a method for controlling the air conditioner according to an embodiment of the disclosure.

FIG. 14 illustrates an example of a method for controlling the air conditioner according to an embodiment.

An example 1100 of a method of controlling the defrost valve 310 based on the temperature of the defrost pipe 300 will be described with reference to FIG. 14.

The air conditioner 1 may detect the temperature of the defrost pipe 300 (1110). For example, the first temperature sensor 321 may detect the temperature of the defrost pipe 300 and transmit the detected first temperature value to the controller 700.

The air conditioner 1 may control the defrost valve 310 based on the detected temperature (1120). For example, the controller 700 may open and close the defrost valve 310 in response to the first temperature value of the first temperature sensor 321. For example, the controller 700 may adjust the opening degree of the defrost valve 310 in response to the first temperature value of the first temperature sensor 321.

Figure 15:
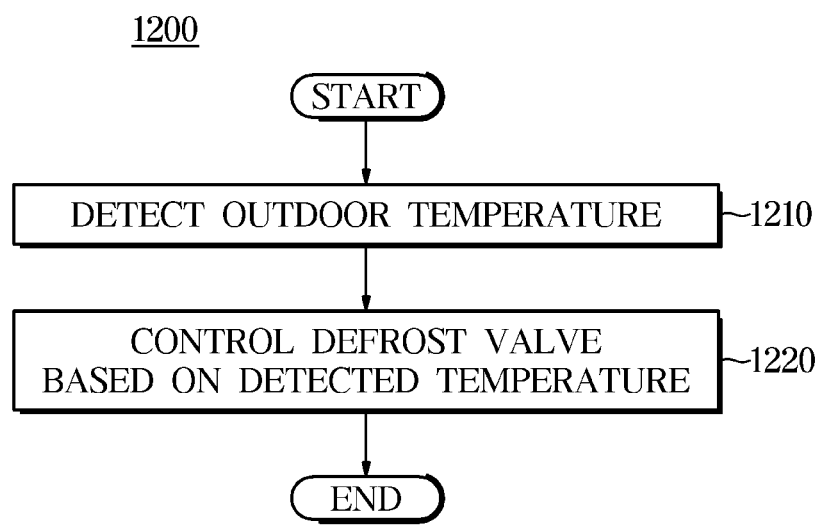
FIG. 15 illustrates an example of a method for controlling the air conditioner according to an embodiment of the disclosure.

FIG. 15 illustrates an example of a method for controlling the air conditioner according to an embodiment.

An example 1200 of a method of controlling the defrost valve 310 based on the outdoor temperature will be described with reference to FIG. 15.

The air conditioner 1 may detect the outdoor temperature (1210). For example, the second temperature sensor 322 may detect the outdoor temperature and transmit the detected second temperature value to the controller 700.

The air conditioner 1 may control the defrost valve 310 based on the detected temperature (1220). For example, the controller 700 may open and close the defrost valve 310 in response to the second temperature value of the second temperature sensor 322. For example, the controller 700 may adjust the opening degree of the defrost valve 310 in response to the second temperature value of the second temperature sensor 322.

Figure 16:
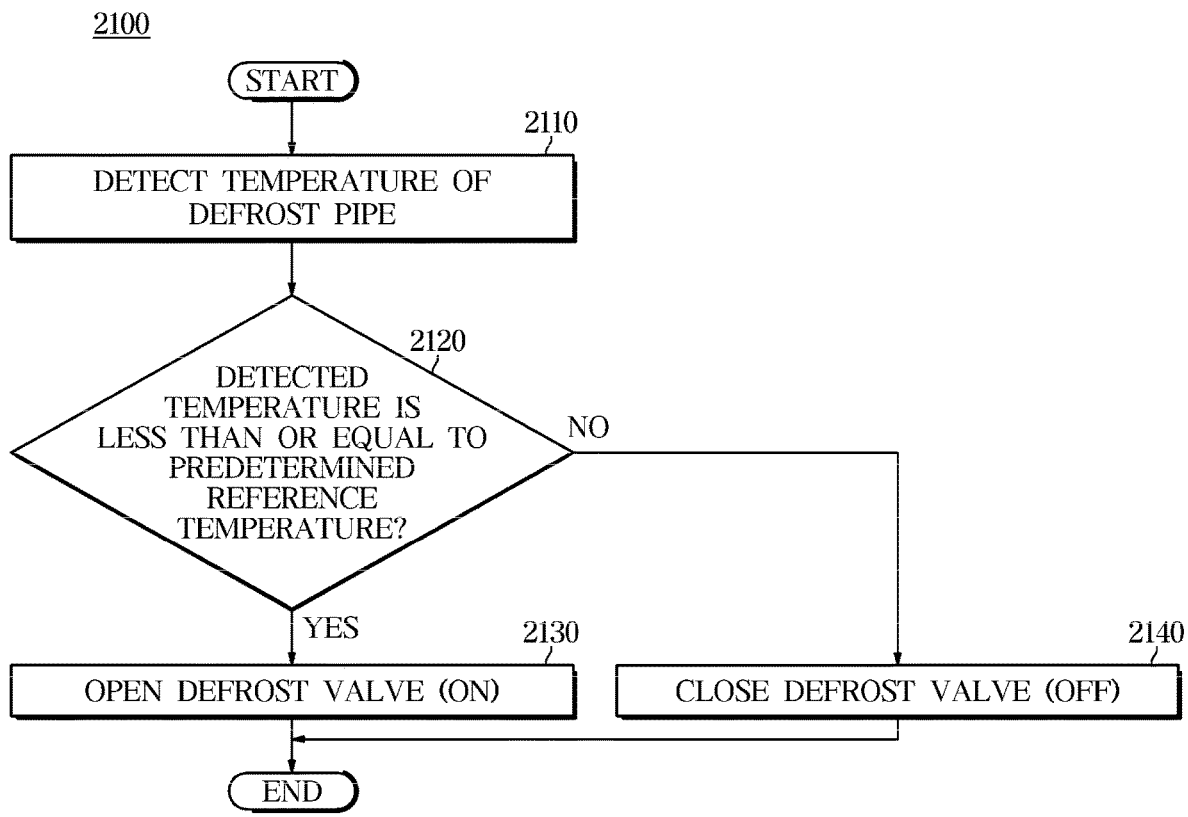
FIG. 16 illustrates an example of a method of controlling a defrost valve by comparing a defrost pipe temperature of the air conditioner with a predetermined reference temperature according to an embodiment of the disclosure.

FIG. 16 illustrates an example of a method of controlling a defrost valve by comparing a defrost pipe temperature of the air conditioner with a predetermined reference temperature according to an embodiment.

An example 2100 of a method of controlling the defrost valve 310 based on the temperature of the defrost pipe 300 will be described with reference to FIG. 16. For example, the example 2100 of the control method may be an example of a control method during the heating operation.

The air conditioner 1 may detect the temperature of the defrost pipe 300 (2110). For example, the first temperature sensor 321 may detect the temperature of the defrost pipe 300 and transmit the detected first temperature value to the controller 700.

The air conditioner 1 may compare the detected temperature (first temperature value) with a predetermined reference temperature (first reference temperature). For example, the air conditioner 1 may determine whether the detected temperature is less than or equal to the predetermined reference temperature (2120). For example, the controller 700 may determine whether the detected temperature is less than or equal to the predetermined reference temperature (2120).

In response to the detected temperature being less than or equal to the predetermined reference temperature (first reference temperature) (yes in 2120), the defrost valve 310 may be opened (2130). In response to the detected temperature being less than or equal to the predetermined reference temperature (first reference temperature), the controller 700 may open the defrost valve 310. When the defrost valve 310 is opened, the refrigerant discharged from the compressor 40 may flow through the defrost pipe 300. For example, the air conditioner 1 may perform an operation that prevents freezing of the base 15.

In response to the detected temperature not being less than or equal to the predetermined reference temperature (first reference temperature) (no in 2120), the defrost valve 310 may be closed (2140). In response to the detected temperature not being less than or equal to the predetermined reference temperature (first reference temperature), the controller 700 may close the defrost valve 310. When the defrost valve 310 is closed, the refrigerant discharged from the compressor 40 may not flow through the defrost pipe 300. For example, the air conditioner 1 may not perform the operation that prevents freezing of the base 15. For example, the air conditioner 1 may stop the operation that prevents freezing of the base 15.

However, in FIG. 16, the method of controlling the defrost valve 310 based on whether the temperature of the defrost pipe 300 is less than or equal to the predetermined reference temperature (first reference temperature) has been illustrated, but is not limited thereto. For example, the controller 700 may control the defrost valve 310 based on whether the temperature of the defrost pipe 300 is less than the predetermined reference temperature. At this time, when the temperature of the defrost pipe 300 is greater than or equal to the predetermined reference temperature, the defrost valve 310 may be closed. When it is determined that the temperature of the defrost pipe 300 is equal to a predetermined reference temperature, the defrost valve 310 may be closed.

Figure 17:
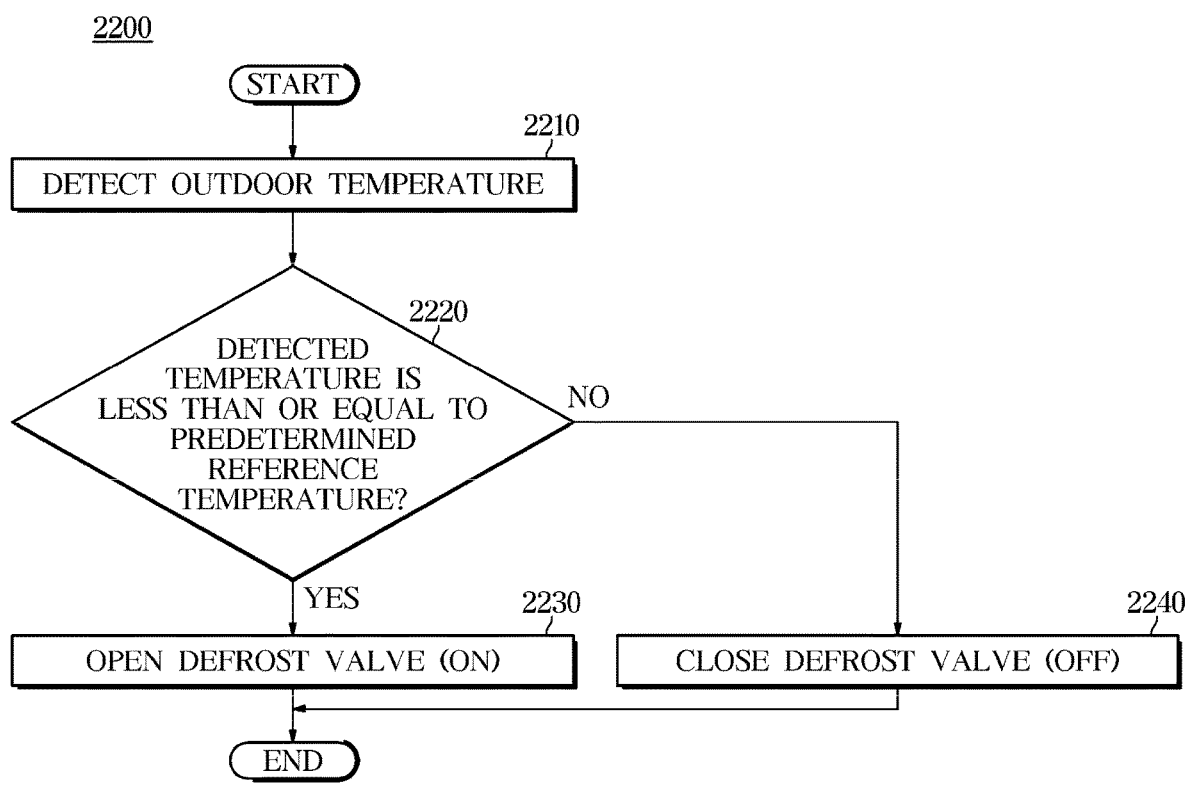
FIG. 17 illustrates an example of a method of controlling the defrost valve by comparing an outdoor temperature of the air conditioner with a predetermined reference temperature according to an embodiment of the disclosure.

FIG. 17 illustrates an example of a method of controlling the defrost valve by comparing an outdoor temperature of the air conditioner with a predetermined reference temperature according to an embodiment.

An example 2200 of a method of controlling the defrost valve 310 based on the outdoor temperature will be described with reference to FIG. 17. For example, the example 2200 of the control method may be an example of a control method during the heating operation.

The air conditioner 1 may detect an outdoor temperature (2210). For example, the second temperature sensor 322 may detect the outdoor temperature and transmit the detected second temperature value to the controller 700.

The air conditioner 1 may compare the detected temperature (second temperature value) with a predetermined reference temperature (second reference temperature). For example, the air conditioner 1 may determine whether the detected temperature is less than or equal to the predetermined reference temperature (2220). For example, the controller 700 may determine whether the detected temperature is less than or equal to the predetermined reference temperature (2220).

In response to the detected temperature being less than or equal to the predetermined reference temperature (second reference temperature) (yes in 2220), the defrost valve 310 may be opened (2230). In response to the detected temperature being less than or equal to the predetermined reference temperature (second reference temperature), the controller 700 may open the defrost valve 310. When the defrost valve 310 is opened, the refrigerant discharged from the compressor 40 may flow through the defrost pipe 300. For example, the air conditioner 1 may perform the operation that prevents freezing of the base 15.

In response to the detected temperature not being less than or equal to the predetermined reference temperature (second reference temperature) (no in 2220), the defrost valve 310 may be closed (2240). In response to the detected temperature not being less than or equal to the predetermined reference temperature (second reference temperature), the controller 700 may close the defrost valve 310. When the defrost valve 310 is closed, the refrigerant discharged from the compressor 40 may not flow through the defrost pipe 300. For example, the air conditioner 1 may not perform the operation that prevents freezing of the base 15. For example, the air conditioner 1 may stop the operation that prevents freezing of the base 15.

However, in FIG. 17, a method of controlling the defrost valve 310 based on whether the outdoor temperature is less than or equal to the predetermined reference temperature (second reference temperature) has been illustrated, but is not limited thereto. For example, the controller 700 may control the defrost valve 310 based on whether the temperature of the defrost pipe 300 is less than the predetermined reference temperature. At this time, when the temperature of the defrost pipe 300 is greater than or equal to the predetermined reference temperature, the defrost valve 310 may be closed. When it is determined that the temperature of the defrost pipe 300 is equal to the predetermined reference temperature, the defrost valve 310 may be closed.

Figure 18:
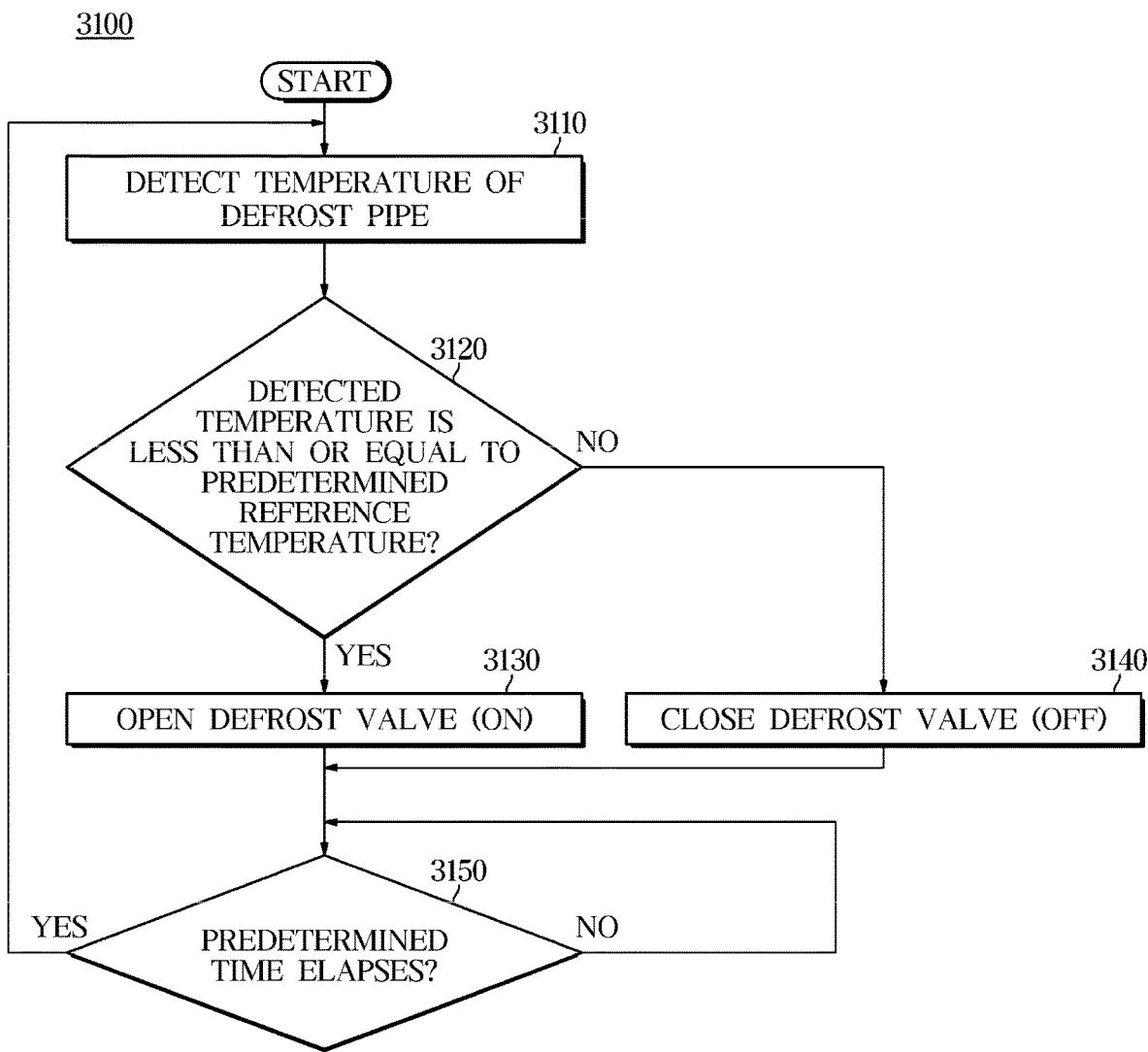
FIG. 18 illustrates an example of a method of controlling the defrost valve when a predetermined time elapses after comparing the defrost pipe temperature of the air conditioner with the predetermined reference temperature according to an embodiment of the disclosure.

FIG. 18 illustrates an example of a method of controlling the defrost valve when a predetermined time elapses after comparing the defrost pipe temperature of the air conditioner with the predetermined reference temperature.

An example 3100 of a method of controlling the defrost valve 310 based on the temperature of the defrost pipe 300 will be described with reference to FIG. 18. For example, the example 3100 of a control method may be an example of a control method during the heating operation.

The air conditioner 1 may detect the temperature of the defrost pipe 300 (3110). For example, the first temperature sensor 321 may detect the temperature of the defrost pipe 300 and transmit the detected first temperature value to the controller 700.

The air conditioner 1 may compare the detected temperature (first temperature value) with the predetermined reference temperature (first reference temperature). For example, the air conditioner 1 may determine whether the detected temperature is less than or equal to the predetermined reference temperature (3120). For example, the controller 700 may determine whether the detected temperature is less than or equal to the predetermined reference temperature (3120).

In response to the detected temperature being less than or equal to the predetermined reference temperature (first reference temperature) (yes in 3120), the defrost valve 310 may be opened (3130). In response to the detected temperature being less than or equal to the predetermined reference temperature (first reference temperature), the controller 700 may open the defrost valve 310. When the defrost valve 310 is opened, the refrigerant discharged from the compressor 40 may flow through the defrost pipe 300. For example, the air conditioner 1 may perform the operation that prevents freezing of the base 15.

In response to the detected temperature not being less than or equal to the predetermined reference temperature (first reference temperature) (no in 3120), the defrost valve 310 may be closed (3140). In response to the detected temperature not being less than or equal to the predetermined reference temperature (first reference temperature), the controller 700 may close the defrost valve 310. When the defrost valve 310 is closed, the refrigerant discharged from the compressor 40 may not flow through the defrost pipe 300. For example, the air conditioner 1 may not perform the operation that prevents freezing of the base 15. For example, the air conditioner 1 may stop the operation that prevents freezing of the base 15.

Meanwhile, as described above, the controller 700 may control the defrost valve 310 based on whether the temperature of the defrost pipe 300 is less than the predetermined reference temperature.

The air conditioner 1 may determine whether a predetermined time elapses (3150). The controller 700 may determine whether the predetermined time elapses. For example, a user can set the predetermined time through the control panel 500. For example, a user can set a period for detecting the temperature of the defrost pipe 300 through the control panel 500.

In response to the expiration of the predetermined time (yes in 3150), the air conditioner 1 may detect the temperature of the defrost pipe 300 (3110). The controller 700 may control the defrost valve 310 based on the temperature of the defrost pipe 300.

In response to the non-expiration of the predetermined time (no in 3150), the air conditioner 1 may determine again whether the predetermined time elapses. That is, the air conditioner 1 may suspend detecting of the temperature of the defrost pipe 300 until the predetermined time elapses.

Accordingly, the air conditioner 1 may continuously detect the temperature of the defrost pipe 300 and control the defrost valve 310 in response to the temperature of the defrost pipe 300. Accordingly, the flow rate of the refrigerant flowing through the defrost pipe 300 may be continuously controlled.

Figure 19:
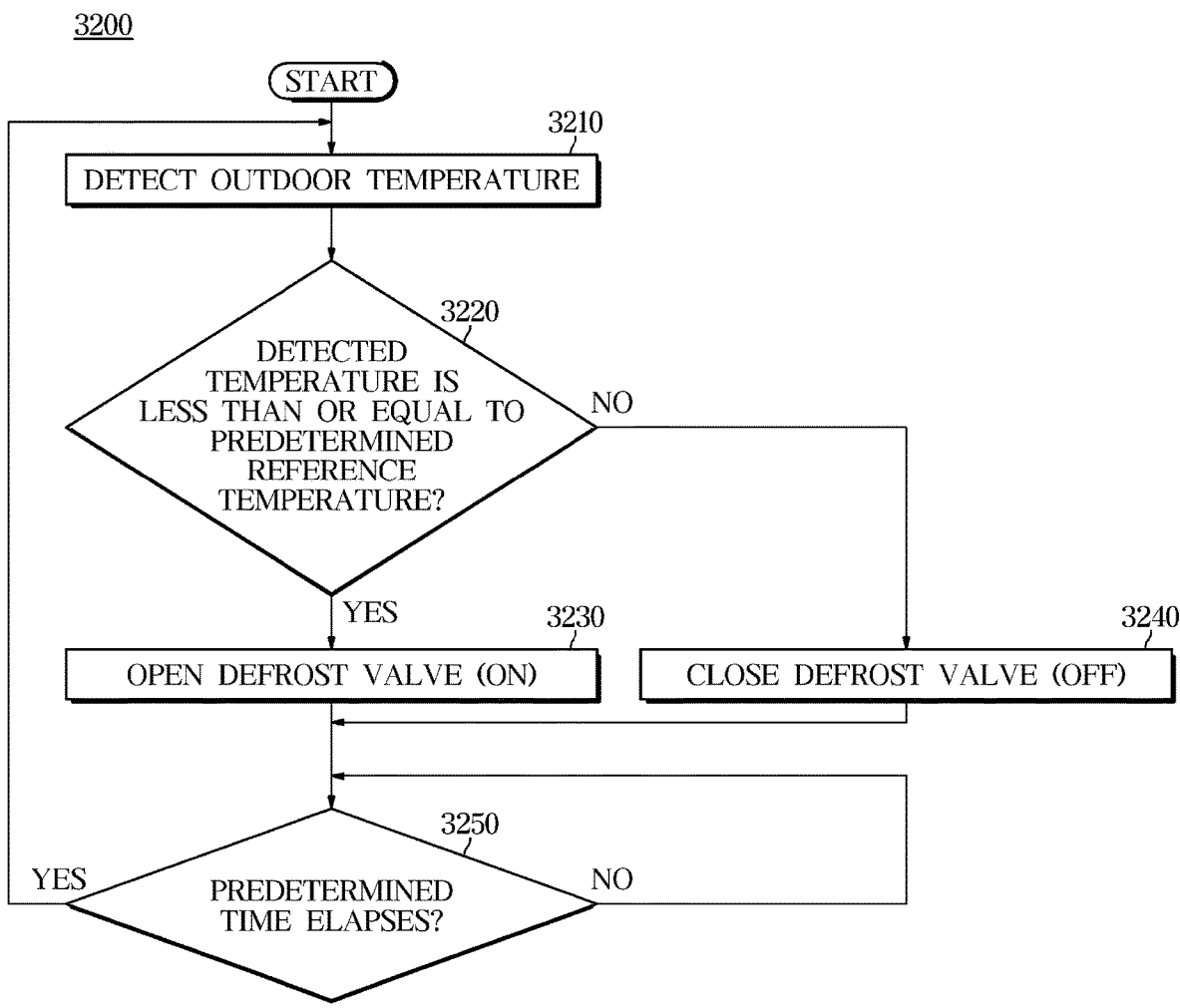
FIG. 19 illustrates an example of a method of controlling the defrost valve when a predetermined time elapses after comparing the outdoor temperature of the air conditioner with the predetermined reference temperature according to an embodiment of the disclosure.

FIG. 19 illustrates an example of a method of controlling the defrost valve when a predetermined time elapses after comparing the outdoor temperature of the air conditioner with the predetermined reference temperature according to an embodiment.

An example 3200 of a method of controlling the defrost valve 310 based on the temperature of the defrost pipe 300 will be described with reference to FIG. 19. For example, the example 3200 of a control method may be an example of a control method during the heating operation.

The air conditioner 1 may detect an outdoor temperature (3210). For example, the second temperature sensor 321 may detect the outdoor temperature and transmit the detected second temperature value to the controller 700.

The air conditioner 1 may compare the detected temperature (second temperature value) with the predetermined reference temperature (second reference temperature). For example, the air conditioner 1 may determine whether the detected temperature is less than or equal to the predetermined reference temperature (3220). For example, the controller 700 may determine whether the detected temperature is less than or equal to the predetermined reference temperature (3220).

In response to the detected temperature being less than or equal to the predetermined reference temperature (second reference temperature) (yes in 3220), the defrost valve 310 may be opened (3230). In response to the detected temperature being less than or equal to the predetermined reference temperature (second reference temperature), the controller 700 may open the defrost valve 310. When the defrost valve 310 is opened, the refrigerant discharged from the compressor 40 may flow through the defrost pipe 300. For example, the air conditioner 1 may perform the operation that prevents freezing of the base 15.

In response to the detected temperature not being less than or equal to the predetermined reference temperature (second reference temperature) (no in 3220), the defrost valve 310 may be closed (3240). In response to the detected temperature not being less than or equal to the predetermined reference temperature (second reference temperature), the controller 700 may close the defrost valve 310. When the defrost valve 310 is closed, the refrigerant discharged from the compressor 40 may not flow through the defrost pipe 300. For example, the air conditioner 1 may not perform the operation that prevents freezing of the base 15. For example, the air conditioner 1 may stop the operation that prevents freezing of the base 15.

Meanwhile, as described above, the controller 700 may control the defrost valve 310 based on whether the outdoor temperature is less than the predetermined reference temperature.

The air conditioner 1 may determine whether a predetermined time elapses (3250). The controller 700 may determine whether the predetermined time elapses. For example, a user can set the predetermined time through the control panel 500. For example, the user can set a period for detecting the outdoor temperature through the control panel 500.

In response to the expiration of the predetermined time (yes in 3250), the air conditioner 1 may detect the outdoor temperature (3210). The controller 700 may control the defrost valve 310 based on the outdoor temperature.

In response to the non-expiration of the predetermined time (no in 3250), the air conditioner 1 may determine again whether the predetermined time elapses. That is, the air conditioner 1 may suspend detecting of the outdoor temperature until the predetermined time elapses.

Accordingly, the air conditioner 1 may continuously detect the outdoor temperature and control the defrost valve 310 in response to the outdoor temperature. Accordingly, the flow rate of the refrigerant flowing through the defrost pipe 300 may be continuously controlled.

As is apparent from the above description, an air conditioner may include a refrigerant pipe including an improved structure.

Further, an air conditioner may prevent freezing of defrost water (or condensed water) at a base of an outdoor unit.

Further, an air conditioner may have an improved air conditioning performance.

In accordance with another aspect of the disclosure, an air conditioner may include a housing including a base, a compressor accommodated in the housing, an outdoor heat exchanger accommodated in the housing and including a first region and a second region provided below the first region, a first four-way valve arranged between a discharge side of the compressor and the first region of the outdoor heat exchanger, and a second four-way valve arranged between the discharge side of the compressor and the second region of the outdoor heat exchanger. The air conditioner includes a base pipe installed on the base and provided to allow the refrigerant discharged from the compressor to flow therethrough. The air conditioner includes a base pipe valve arranged on the base pipe to adjust a flow rate of the refrigerant.

The base pipe may be provided to bypass the first four-way valve and the second four-way valve at the discharge side of the compressor.

The base pipe may be connected to one port of the second four-way valve to allow the refrigerant, which is discharged from the compressor and passes through the second four-way valve, to flow.

The air conditioner may include a pipe temperature sensor arranged on the base pipe. The air conditioner may further include a controller configured to control an opening degree of the base pipe valve based on a temperature value measured by the pipe temperature sensor.

The air conditioner may include an outdoor temperature sensor configured to measure an outdoor temperature. The air conditioner may further include a controller configured to control an opening degree of the base pipe valve based on a temperature value measured by the outdoor temperature sensor.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. An air conditioner comprising:
   a compressor including a discharge side;
   an outdoor heat exchanger configured to exchange heat with outdoor air;
   a base arranged to support the compressor and the outdoor heat exchanger;

a four-way valve arranged between the discharge side of the compressor and the outdoor heat exchanger;

a defrost pipe arranged at the base and configured to receive refrigerant discharged from the compressor to supply heat of the refrigerant discharged from the compressor to the base; and a defrost valve arranged on the defrost pipe at a downstream side of the base relative to the refrigerant flowing through the defrost pipe, and configured to adjust a flow rate of the refrigerant flowing through the defrost pipe by adjusting an opening degree while the refrigerant is flowing, based on a temperature of the defrost pipe, wherein the defrost valve is configured to be opened in response to the temperature of the defrost pipe being less than a predetermined reference temperature, such that refrigerant flows through the defrost pipe, and to be closed or reduce the flow rate in response to the temperature of the defrost pipe being greater than the predetermined reference temperature.

2. The air conditioner of claim 1, further comprising:
a controller configured to control an opening degree of the defrost valve.

3. The air conditioner of claim 1, further comprising:
an expansion valve configured to depressurize a refrigerant flowing into or flowing out of the outdoor heat exchanger,
wherein a first end of the defrost pipe is connected to the discharge side of the compressor, and
a second end of the defrost pipe is connected between the outdoor heat exchanger and the expansion valve.

4. The air conditioner of claim 1, wherein
the outdoor heat exchanger includes:
an upper part, and
a lower part, and
the four-way valve is a first four-way valve,
the first four-way valve is arranged between the discharge side of the compressor and the upper part of the outdoor heat exchanger, and
the air conditioner further includes a second four-way valve arranged between the discharge side of the compressor and the lower part of the outdoor heat exchanger.

5. The air conditioner of claim 4, further comprising:
an expansion valve configured to depressurize a refrigerant flowing into or flowing out of the outdoor heat exchanger,
wherein a first end of the defrost pipe is connected to the second four-way valve, and
a second end of the defrost pipe is connected between the outdoor heat exchanger and the expansion valve.

6. The air conditioner of claim 2, further comprising:
a temperature sensor configured to detect the temperature of the defrost pipe or to detect an outdoor temperature.

7. The air conditioner of claim 6, wherein
the controller is configured to control the defrost valve based on information of the temperature sensor corresponding to the detected temperature.

8. The air conditioner of claim 7, wherein
the controller is configured to open the defrost valve in response to the detected temperature being less than or equal to a predetermined reference temperature during a heating operation.

9. The air conditioner of claim 7, wherein
the controller is configured to close the defrost valve in response to the detected temperature being greater than or equal to a predetermined reference temperature during a heating operation.

10. The air conditioner of claim 6, wherein
the temperature sensor is arranged on the defrost pipe upstream of the defrost valve to detect the temperature of the defrost pipe.

11. The air conditioner of claim 4, further comprising:
a first connection pipe arranged to connect the discharge side of the compressor and the first four-way valve; and
a second connection pipe arranged to connect the discharge side of the compressor and the second four-way valve,
wherein the defrost pipe is arranged to branch from the first connection pipe or the second connection pipe.

12. The air conditioner of claim 5, further comprising:
an accumulator connected to a suction side of the compressor and configured to separate a refrigerant into a liquid refrigerant and a gas refrigerant,
wherein the second four-way valve includes:
a first port connected to the compressor,
a second port connected to the accumulator,
a third port connected to the lower part of the outdoor heat exchanger; and
a fourth port connected to the first end of the defrost pipe.

13. The air conditioner of claim 3, wherein
the refrigerant in the defrost pipe flows from the first end of the defrost pipe toward the second end of the defrost pipe.

14. The air conditioner of claim 4, wherein
during a main defrosting operation,
the first four-way valve is configured to supply the refrigerant discharged from the compressor to the upper part of the outdoor heat exchanger,
the second four-way valve is configured to supply the refrigerant discharged from the compressor to the lower part of the outdoor heat exchanger, and
the defrost valve is configured to be opened.

15. The air conditioner of claim 4, further comprising:
an indoor heat exchanger configured to exchange heat with indoor air; and
an accumulator configured to separate a refrigerant into a liquid refrigerant and a gas refrigerant at a suction side of the compressor,
wherein the first four-way valve includes:
a first port connected to the discharge side of the compressor,
a second port connected to the accumulator,
a third port connected to the upper part of the outdoor heat exchanger, and
a fourth port connected to the indoor heat exchanger,
the second four-way valve includes:
a fifth port connected so as to receive refrigerant from the discharge side of the compressor, and
a sixth port connected to the lower part of the outdoor heat exchanger, and
in response to requiring a sub-defrosting operation of the lower part of the outdoor heat exchanger, the first port and the fourth port of the first four-way valve are connected, the second port and the third port of the first four-way valve are connected, and the fifth port and the sixth port of the second four-way valve are connected.

* * * * *